(12) United States Patent
Suzuki et al.

(10) Patent No.: US 6,607,856 B2
(45) Date of Patent: Aug. 19, 2003

(54) SOLID POLYMER ELECTROLYTE HAVING HIGH-DURABILITY

(75) Inventors: Takahisa Suzuki, Aichi-ken (JP); Takumi Taniguchi, Aichi-ken (JP); Yu Morimoto, Aichi-ken (JP); Masaya Kawasumi, Aichi-ken (JP); Naoki Hasegawa, Aichi-ken (JP); Atsushi Kamiya, Aichi-ken (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 253 days.

(21) Appl. No.: 09/725,267

(22) Filed: Nov. 29, 2000

(65) Prior Publication Data

US 2001/0038937 A1 Nov. 8, 2001

(30) Foreign Application Priority Data

Nov. 29, 1999 (JP) ............................................. 11-337015
Nov. 20, 2000 (JP) ........................................ 2000-352300

(51) Int. Cl.[7] ............................. H01M 4/00; H01M 8/10
(52) U.S. Cl. ............................. 429/30; 429/27; 429/29; 429/33
(58) Field of Search ........................ 429/27, 29, 30, 429/33

(56) References Cited

U.S. PATENT DOCUMENTS

| | | | |
|---|---|---|---|
| 4,664,761 A | | 5/1987 | Zupancic et al. |
| 5,525,436 A | | 6/1996 | Savinell et al. |
| 5,643,689 A | | 7/1997 | Fleischer et al. |
| 5,679,482 A | * | 10/1997 | Ehrenberg et al. ............ 204/296 |
| 5,741,408 A | | 4/1998 | Helmer-Metzmann et al. |
| 5,789,106 A | | 8/1998 | Rosenmeier et al. |
| 6,057,377 A | * | 5/2000 | Sasaki et al. ................. 210/656 |
| 6,242,135 B1 | * | 6/2001 | Mushiake ........................ 429/30 |
| 6,248,469 B1 | * | 6/2001 | Formato et al. ............. 429/300 |

FOREIGN PATENT DOCUMENTS

| | | |
|---|---|---|
| JP | 60-78645 | 5/1985 |
| JP | 4-56794 | 2/1992 |
| JP | 6-25443 | 2/1994 |
| JP | 7-24314 | 1/1995 |
| JP | 9-87510 | 3/1997 |
| JP | 2000-80166 | 3/2000 |
| WO | WO 99/54389 | 10/1999 |

OTHER PUBLICATIONS

H. R. Allcock et al., "Phenylphosphonic Acid Functionalized Poly[aryloxyphosphazenes]", Macromolecules, vol. 35, 2002, pp. 3484–3489.*

(List continued on next page.)

*Primary Examiner*—Randy Gulakowski
*Assistant Examiner*—Donald V. Scaltrito
(74) *Attorney, Agent, or Firm*—Oblon, Spivak, McClelland, Maier & Neustadt, P.C.

(57) ABSTRACT

In solid polymer electrolyte having high-durability, comprising a polymer electrolyte material having a hydrocarbon part, a chelate group and an electrolyte group are introduced into the polymer electrolyte material. The chelate group contains a phosphonic acid group, nitrogen, both of nitrogen and a phosphonic acid group (one or more selected from the group consisting of alkylamino monophosphonic acid groups, alkylamino diphosphonic acid groups, dialkylamino monophosphonic acid groups, alkylalkylene diamine triphosphonic acid groups, and alkylimino phosphonic acid groups) or, both of nitrogen and a carboxylic acid group (one or more selected from the group consisting of alkylamino monocarboxylic acid groups, alkylamino dicarboxylic acid groups, dialkylamino monocarboxylic acid groups, alkylalkylene diamine tricarboxylic acid groups, and alkylimino carboxylic acid groups).

31 Claims, 9 Drawing Sheets

OTHER PUBLICATIONS

S. D. Pederson et al., "The Synthesis of Phosphonate Esters Containing Fluorinated Vinyl Ethers", J. Org. Chem., vol. 61, 1996, pp. 8024–2031.*

C. V. Kumar et al., "Nanoencapsulation of Cyctochrome c and Horseradish Peroxidase at the Galleries of Zirconium Phosphate", Chemistry of Materials, vol. 9, 1997, pp. 863–870.*

T. E. Mallouk et al., "Molecular Recognition in Lamellar Solids and Thin Films", Acc. Chem. Res., vol. 31, 1998, pp. 209–217.*

K. Hu et al., "Monitoring Multilayer Film Growth with the Atomic Force Microscope. Aluminum(III) Alkanebisphosphonate Multilayer Films and DNA Immobilization", Anal. Chem., vol. 70, 1998, pp. 2870–2875.*

Q. Guo et al., "Sulfonated and Crosslinked Polyphosphazene Based Proton Exchange Membranes", vol. 154, 1999, pp. 175–181.*

* cited by examiner

Polarization curve in the initial stage

Polarization curve at 50 hours passed from starting operation

SOLID POLYMER ELECTROLYTE HAVING HIGH-DURABILITY

BACKGROUND OF THE INVENTION

1. Field of the Invention

The present invention relates to a solid polymer electrolyte having high-durability, and more particularly, to the solid polymer electrolyte having high-durability, which is excellent in oxidation resistance and preferably employed as a solid polymer electrolyte membrane for use in a polymer electrolyte fuel cell, a water electrolysis cell and the like.

2. Description of Related Art

Solid polymer electrolyte is the solid polymer material, in which the polymer chains have electrolyte groups, such as sulfonic acid groups, carboxylic acid groups and the like. The solid polymer electrolyte forms a strong bond with a specific ion and causes cations or anions to pass through selectively. The solid polymer electrolyte, therefore, is formed into particles, fibers, films or the like, and then is utilized for various purposes, such as electrodialysis, diffuse dialysis, and a battery.

In such backgrounds, for example, the above mentioned solid polymer electrolyte acts as a polymer electrolyte membrane for use in a polymer electrolyte fuel cell and a water electrolysis cell. In this case, the polymer electrolyte fuel cell comprises a proton-conducting solid polymer electrolyte membrane, the both surfaces of which are provided with a pair of electrodes. With such structure, the polymer electrolyte fuel cell produces electromotive force in a manner of supplying pure $H_2$ or reformate $H_2$ gases to one electrode (an anode) as fuel gases, and supplying $O_2$ gases or air to another electrode as oxidant. Water electrolysis is a process for producing $H_2$ and $O_2$ by electrolyzing water by using a solid polymer electrolyte membrane.

On the other hand, in case of the above-mentioned polymer electrolyte fuel cell and water electrolysis cell, peroxide is produced by the electrode reaction, at a catalyst layer formed on a boundary face between a solid polymer electrolyte membrane and an electrode. Then peroxide diffuses, and then, the radical reaction occurs to form peroxide radicals, thereby causing the electrolyte to be degraded disadvantageously. Forming peroxide radicals is promoted by metal ions ($Fe^{2+}$ and $Cu^{2+}$ and the like) effluent from a tube for supplying mist, blended with supplied-gases for keeping electrolyte wetting.

To solve such problems, various electrolytes have been developed that are excellent in oxidation resistance. Particularly, perfluorosulfonic acid polymers known under the trade name of "Nafion" available from E.I. du Pont de Nemours and Company, have extremely-high chemical stability and are hardly oxidized in the presence of peroxide (hydrogen peroxide $H_2O_2$), because they are the perfluorinated electrolyte materials having C—F bond. Thus perfluorosulfonic acid polymers are excellent in property.

However, there is such problem that it is difficult to manufacture the perfluorinated perfluorosulfonic acid polymers, and it costs too much to obtain the raw materials because of its difficulty in mass production. Accordingly, use of the electrolyte membrane made of perfluorosulfonic acid polymer materials is limited to the special destination, such as a solid polymer fuel cell for space or military and the like, so it makes difficult to apply perfluorosulfonic acid polymer materials to unmilitary demands, such as a solid polymer fuel cell for a low-pollution drive source for automobile.

While, another materials have been examined and researched, instead of wholly fluorinated perfluorosulfonic, acid polymers. For example, following are listed up as a polymer electrolyte other than a fluorinated electrolyte: a crosslinked polystyrene-grafted resin membrane introducing sulfonic acid groups disclosed in Swiss patent application No. 02 636/93-6, a polyethersulfone resin membrane introducing sulfonic acid groups disclosed in Japanese patent publication laid-open No. Hei 10-45913, and the like. In addition, Japanese patent publication laid-open No. Hei 9-102322 discloses a sulfonic acid type ethylene-tetrafluoroethylene (ETFE) copolymer-graft-polystyrene membrane, which comprises the main chains formed by copolymerization of a fluorocarbon-based vinyl monomer and a hydrocarbon vinyl monomer and the hydrocarbon-based side chains containing sulfonic acid groups.

Furthermore, U.S. Pat. No. 4,012,303 and U.S. Pat. No. 4,605,685 disclose a sulfonic acid type ETFE-graft-poly (trifluorostyrene) membrane, which is prepared by graft polymerization of $\alpha,\beta,\beta$-trifluorostyrene and the membrane prepared by copolymerization of a fluorocarbon-based vinyl monomer and a hydrocarbon-based vinyl monomer, then introducing sulfonic acid groups into the resulting membrane to prepare the desired solid polymer electrolyte membrane. In this process, $\alpha,\beta,\beta$-trifluorostyrene, produced by styrene fluorination, is employed instead of styrene on the assumption that chemical stability of the side chains introducing sulfonic acid groups in polystyrene is insufficient.

These electrolyte materials, however, such as a non-fluorinated electrolyte membrane, for example, the crosslinked polystyrene-grafted resin membrane introducing sulfonic acid groups disclosed in Swiss patent application No. 02 636/93-6, the polyether sulfone resin membrane introducing sulfonic acid groups disclosed in Japanese patent publication laid-open No. Hei 10-45913 and the like, can advantageously be manufactured easier at lower cost than the wholly fluorinated electrolyte membrane represented by Nafion, but the non-fluorinated electrolyte membrane is easily degraded by peroxide produced by the electrode reaction, thus the oxidation resistance of which has been controlled to be low disadvantageously. Because the non-fluorinated compounds have the hydrocarbon structure susceptible to the oxidation reaction caused by peroxide radicals.

Furthermore, the sulfonic acid type ETFE-graft-polystyrene membrane disclosed in Japanese patent publication Laid-open No. Hei 9-102322 can be obtained at a low price and robust enough to function as a solid polymer electrolyte membrane for use in a fuel cell, in addition to this, a conductivity of which can be improved by increasing an introducing amount of sulfonic acid groups. Furthermore, an oxidation resistance of the main chains produced by copolymerization between a fluorocarbon-based vinyl monomer and a hydrocarbon-based vinyl monomer is sufficiently high, but the side chains introducing sulfonic acid groups is a hydrocarbon-based polymer susceptible to oxidation and degradation. Accordingly, application of the sulfonic acid type ETFE-graft-polystyrene membrane to a fuel cell causes the oxidation resistance of whole membrane to be insufficient, thus resulting in poor durability disadvantageously.

Furthermore, in case of utilizing a sulfonic acid type ETFE-graft-poly (trifluorostyrene) membrane disclosed in U.S. Pat. No. 4,012,303 and the like, it is considered that the above-mentioned problem is solved because the side chains thereof are composed of fluorine-based polymers. However, the base material of the side chains, $\alpha,\beta,\beta$-trifluorostyrene, is difficult to synthesize, thus it will be costly to apply the same to a solid polymer electrolyte membrane for use in a fuel cell, as similar to the above-mentioned Nafion. In addition, α,β, β-trifluorostyrene is susceptible to degradation, thus it is difficult to deal with α,β,β-trifluorostyrene, and it is not excellent in polymerization reactivity. Accordingly, an amount of α,β,β-trifluorostyrene, which should be introduced as the graft side chains, is small, as a result, the resulting membrane has a low conductivity.

Furthermore, durability of the crosslinked polystyrene-grafted resin membrane introducing sulfonic acid groups disclosed in above-mentioned Swiss patent application is higher than that one disclosed in the above-mentioned US Patent. However, the above-mentioned problem cannot solved essentially by the above-mentioned technique in the point of improvement of polymeric oxidation resistance, because the technique prevents reduction of components, produced by degradation, by means of increasing chemical bonds.

On the other hand, for example, the Japanese patent publication Laid-open No. Hei 6-103992 discloses such technique that holds catalyst metals in an electrolyte and then decomposes peroxide for the purpose of preventing a hydrocarbon-based ion-exchange membrane from being degraded by radicals of peroxide, such as hydrogen peroxide and the like. However, the catalyst metals disclosed therein are utilized for reacting hydrogen with oxygen directly, for which platinum is usually employed. It will be very costly. Additionally, these catalyst metals basically act so as to decompose hydrogen peroxide which causes electrolyte to be degraded, while it also act as catalyst so as to produce hydrogen peroxide by the direct reaction between oxygen and hydrogen in a state that oxygen coexists with hydrogen. Accordingly, such problem arises that the catalyst metals do not effectively inhibit degradation of electrolyte.

Furthermore, for example, J. Membrane Science, 56 (1991) 143 discloses such attempt that employs a methylstyrene-based electrolyte instead of a polystyrene-based electrolyte, but its effect was limitative. DOE Report FSEC-CR-857-95 discloses examination concerning a hydrocarbon-based electrolyte membrane prepared by sulfonating the main chains which are components of aromatic polymers. The attempt was conducted on the assumption that the main chains had more excellent oxidation resistance than that of polymers having the main chains of single-chain type, but it was not effective enough. Furthermore, the Japanese patent publication Laid-open No. Hei 7-50170 discloses the technique concerning a polymer electrolyte having the main chains of polyolefin, but its durability was low.

Above-mentioned conventional arts were based on such ideas as following: one was, to make a polymer electrolyte structure difficult to be attacked from a point of the stearic hindrance; and another was to cause polymer to protect against attack by way of increasing chemical bonds. However, an oxidizing force produced by oxidizing radicals, such as hydrogen peroxide, was extremely strong, thus the conventional arts could not inhibit effectively the electrolyte degradation.

The inventors has been examined into details repeatedly for the purpose of preventing the peroxide radicals from being produced. As a result, the inventors found that generation of the peroxide radicals could be stopped by processes of trapping metal ions (mainly entering from a tube for fuel supply as described above), such as $Fe^{2+}$, $Cu^{2+}$ or the like, which generated radicals of peroxide such as hydrogen peroxide ($H_2O_2$) generated by a cell reaction; and then inactivating the metal ions. So as to realize the processes, the inventors thought that it would be effective to introduce the chelate groups into an electrolyte membrane by using some means.

Then the inventors examined and thus found the related techniques, for example, as following: Japanese patent publication Kokoku No. Hei B-30276 disclosing a technique utilized for rising an ion conductivity of electrolyte by processes of introducing metal cations, transition metal complex cations, quaternary ammonium cations or the like, into the solid electrolyte materials, and then causing these cations to trap and contain superoxide ($O_2^-$) having an ion conductivity higher than the cations; and Japanese patent publication Laid-open No. Hei 10-510090 disclosing a technique utilized for rising an ion conductivity by processes of causing the electrolyte materials to contain ion complexes composed of aromatic anion groups, and then causing the anion groups of the ion complexes to trap and eliminate cations ($H^+$ ion) to produce anions, thereby rising the ion conductivity. These techniques, however, utilizes ion-exchange so as to trap anions or cations.

SUMMARY OF THE INVENTION

The present invention has been made in view of the above circumstances and has an object to overcome the above problems and to provide a solid polymer electrolyte having high-durability, which is excellent in oxidation resistance and, in case of utilized as a solid polymer electrolyte for use in a polymer electrolyte fuel cell and a water electrolysis device, capable of inhibiting peroxide radicals from being produced, by processes of trapping and inactivating such metal ions, in a chelate fashion, that cause radicals of peroxide, such as hydrogen peroxide ($H_2O_2$) produced by an electrode reaction.

Further, another object of the present invention is to provide a solid polymer electrolyte having high-durability, which stands long use persistently. Further, another object of the present invention is to extend the use of comparatively inexpensive materials, such as hydrocarbon-based electrolyte materials, other than Nafion.

To achieve the objects and in accordance with the purpose of the present invention, as embodied and broadly described herein, a solid polymer electrolyte having high-durability of the present invention comprises chelate groups that are introduced into polymer electrolyte materials in which electrolyte groups are introduced into the polymers having hydrocarbon parts. The chelate groups trap metal ions in a chelate fashion, the metal ions generating radicals of peroxide generated by an electrode reaction.

In this case, the electrolyte materials contained in the solid polymer electrolyte materials are functional groups which have electrolyte ions, such as sulfonic acid groups, carboxylic acid groups, phosphonic acid groups, sulfone imide groups and the like. Furthermore, above-mentioned electrolyte groups may preferably be strong acid groups, and more preferably be sulfonic acid groups. At a given introducing ratio, the above-listed electrolytes are introduced into the parts which are capable of introducing electrolyte groups and are components of the hydrocarbon part-containing polymers. The introducing ratio may satisfactorily be adjusted in accordance with a use, the state of use, the kinds of electrolyte groups. Preferably, the introducing ratio by equivalent weight may be within a range of 1 50 to 5000 g/eq, more preferably be within a range of 200 to 2000 g/eq. Because if the introducing ratio is less than or equal to 150 g/eq, then the swelling due to water and solvent becomes too large and/or the strength is extremely lowered. As a result, the solid polymer electrolyte materials are not good for use. If the introducing ratio is more than or equal to 5000 g/eq, then a proton-conductivity is extremely lowered with the increase in the ohmic loss. As a result, the solid polymer electrolyte materials may not function as the electrolyte materials. Preferably, the proton-conductivity may satisfactorily be more than or equal to $1\times10^{-2}$ S/cm, and more preferably, more than or equal to $5\times10^{-2}$ S/cm.

As the hydrocarbon part-containing polymer compounds, following examples are listed up: polysulfone resins, polyether sulfone resins, polyether ether ketone resins, polycarbonate resins, polyester carbonate resins, polyarylate resins, polyoxybenzoyl resins, polybenzimidazole resins, polyester ketone resins, linear phenol-formaldehyde resins, crosslinked phenol-formaldehyde resins, urea-formaldehyde resins, melamine-formaldehyde resins, linear polystyrene resins, crosslinked polystyrene resins, linear poly(trifluorostyrene) resins, crosslinked poly(trifluorostyrene) resins, poly(2,3-diphenyl-1,4-phenyleneoxide) resins, polyphenylene oxide resins, poly(allyl ether ketone)resins, poly(allylene ether sulfone) resins, poly(phenyl quinolinic acid) resins, poly(benzyl silane) resins, ethylene-tetrafluoroethylene copolymer-graft-polystyrene resins, poly(vinylidene fluoride) graft-polystyrene resins, polytetrafluoroethylene-graft-polystyrene resins, polyimide resins, polyamide resins, polyether imide resins, polyamide imide resins, polyester resins, polyurethane resins, polysiloxane resins, polysulfide resins, polyacetal resins, poly p-phenylene derivative resins, polyphenylene sulfide resins, and the like. Other than above-listed resins, preferably, the wholly aromatic resins having such main chains as to include the so-called aromatic ring may satisfactorily be copolymers formed by bonding one or more compounds selected from a group consisted of phenylene, biphenylene, and naphthalene with one or more functional groups selected from a group consisted of —$SO_2$—, —O—, —S—, —S—S—, —C(O)—, —C(CH$_3$)$_2$—, —C(CF$_3$)$_2$—, imide, amide, sulfonamide, ester, sulfone ester, urethane, urea and the like. Additionally, the middle of the main chains may satisfactorily contain alkyl groups, alkylene groups and the like; or may satisfactorily have polyphosphazene derivative; or may certainly block copolymers, graft copolymers, starburst dendrimers, polymer blend, that have various polymer segments.

Particularly, the polymers prepared by graft-polymerizing styrene into the polymer partially-containing fluorine as according to claim 24, or the polymers partially-containing aromatic compounds as according to claim 25 may be obtained at a low price and have sufficient strength even if shaped into a thin-film. Furthermore, a conductivity of these polymers can be controlled easily by adjusting the electrolyte group type and the introducing amount. Accordingly, these polymers are particularly preferable as the hydrocarbon part-containing polymers. Following polymers are listed up as the polymers prepared by graft-polymerizing styrene into the polymer partially-containing fluorine: graft copolymers of ethylene-tetrafluoroethylene resins, represented by ethylene-tetrafluoroethylene copolymer-graft-polystyrene resins, that have the main chains composed of ethylene-tetrafluoroethylene copolymer resins and the side chains composed of polystyrene capable of introducing electrolyte groups. Additionally, following polymers are listed up as the polymers partially-containing aromatic compounds: polyether sulfone resins and polyether ether ketone resins.

The chelate groups, which are introduced into the polymer electrolyte, may preferably be such as to contain the phosphonic acid groups or nitrogen. In this case, it may be more preferable if the chelate groups containing nitrogen contain phosphonic acid groups or carboxylic acid groups.

The chelate groups containing phosphonic acid groups form chelate in which two oxygen atoms in phosphonic acid groups coordinate, therefore the oxidation resistance may be improved. Furthermore, the chelate groups containing nitrogen are excellent in the oxidation resistance because nitrogen has a lone-pair forming the strong ligand. In addition, the chelate groups containing both of nitrogen and phosphonic acid groups or both of nitrogen and carboxylic acid groups have the significant chelate effect because acidic groups and nitrogen atoms bring the synergistic chelate effect. Particularly, the chelate groups containing both of nitrogen and phosphonic acid groups, are more preferable because they do not lose chelate effect even under the acidic atmosphere.

As the chelate groups containing phosphonic acid groups, following may be preferable: alkylamino monophosphonic acid groups, alkylamino diphosphonic acid groups, dialkylamino monophosphonic acid groups, alkylalkylene diamine triphosphonic acid groups, and alkylimino phosphonic acid groups.

As the chelate groups containing carboxylic acid groups, following may be preferable: alkylamino monocarboxylic acid groups, alkylamino dicarboxylic acid groups, dialkylamino monocarboxylic acid groups, alkylalkylene diamine tricarboxylic acid groups and alkylimino carboxylic acid groups.

The introducing ratio of chelate groups may satisfactorily be adjusted in accordance with a use, the state of use, and the like. In this case, the proportion of chelate groups may preferably be within a range of 0.001 to 1 by mole fraction, more preferably be within a range of 0.01 to 0.8 by mole fraction, the most preferably be within a range of 0.03 to 0.5 by mole fraction. Where the value of mole fraction is found by an expression of:

$$\text{(Mole fraction)} = \frac{\text{(Mole number of chelate groups)}}{\text{(Mole number of electrolyte groups)} + \text{(Mole number of chelate groups)}}$$

If a mole fraction of chelate groups is less than 0.001, then trapping metal ions maybe insufficient in some cases, therefore, durability is not improved sufficiently. Furthermore, if a mole fraction of chelate groups is too high, then there is tendency for a proton conductivity to fall, disadvantageously.

Above-mentioned chelate groups may preferably be introduced into the hydrocarbon part of polymer electrolyte materials by way of either the direct chemical bonds or, mixing the polymer electrolyte materials with such compounds as to have chelate groups.

As mentioned above, introducing the chelate groups into the polymer electrolyte materials allows the polymer electrolyte materials to avoid degradation due to peroxide radicals and, to maintain a chemical stable state. Because even if the electrode reaction produces peroxide, such as hydrogen peroxide ($H_2O_2$), in a polymer electrolyte fuel cell or the like, then metal ions which, entering from a fuel-supply tube and causing peroxide to form radicals, are trapped by the chelate groups contained in the electrolyte materials, thus the metal ions become to have no relation with the radical reaction of peroxide.

The solid polymer electrolyte having high-durability of the present invention may be used in various shape, such as particles, fibers, or membrane. Among them, membrane is the most preferable for use in the electrochemical device, such as a fuel cell or a water electrolysis device. A thickness of membrane may be varied in accordance with requirements, but, usually, for use in a fuel cell, may preferably be within a range of 1 to 500 μm, more preferably be within a range of 10 to 200 μm, the most preferably be within a range of 20 to 100 μm. The reasons are following: if a thickness of membrane is less than 1 μm then strength is not enough to ensure durability; and if a thickness of membrane is more than 500 μm then an ionic resistance rises up too high.

The polymer electrolyte having high-durability of the present invention can prohibit hydrogen peroxide from forming radicals and be controlled so that electrolyte may not be degraded, even if the metal ions that cause hydrogen peroxide to form radicals are mixed with the polymer electrolyte because the chelate groups trap the metal ions. Accordingly, the comparatively inexpensive materials, such as the polystyrene-based materials, the polyether-based materials, other non-fluorine based electrolyte membranes, various hydrocarbon-based electrolyte membranes, can be used even under the condition where hydrogen peroxide may be formed easily. The present invention, therefore, also brings great economical effect.

DETAILED DESCRIPTION OF THE PREFERRED EMBODIMENTS

Figure 1:
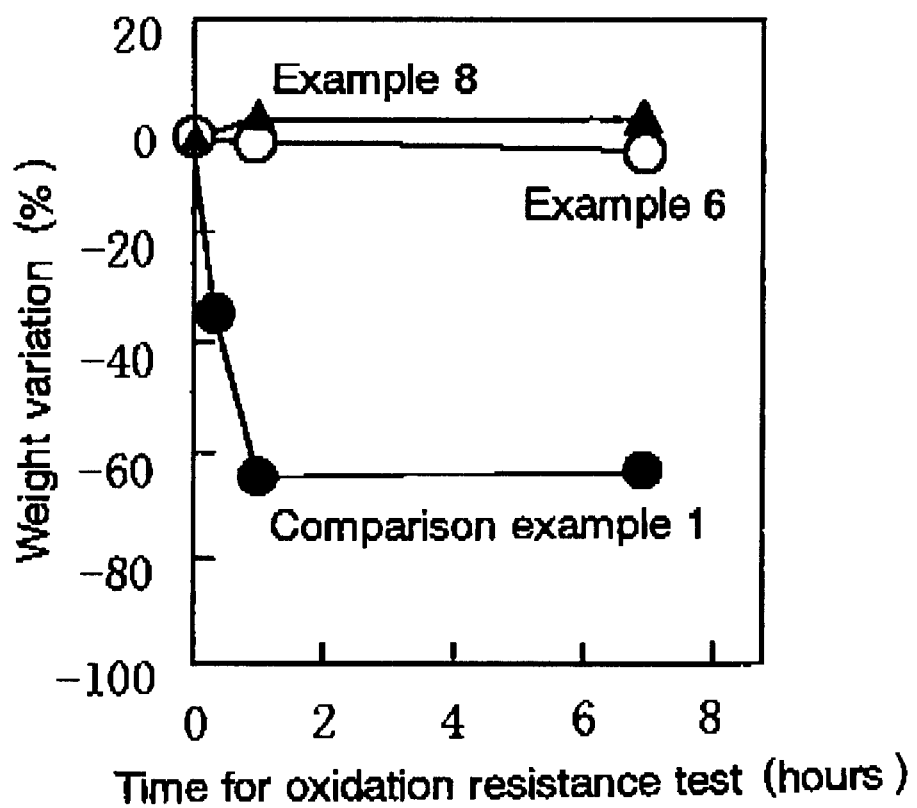
FIG. 1 is a graph showing a weight in percent varying with time in the case of the heating and reflux treatment for various solid polymer electrolyte in hydrogen peroxide solution.

A detailed description of one preferred embodiment of the solid polymer electrolyte having high-durability embodying the present invention will now be given, referring to the accompanying drawings.

Various examples of the preferred embodiment of the present invention will be described in detail hereinbelow.

Examples 1 to 5 were prepared by doping the polymer electrolyte materials with the compounds containing the chelate groups so as to introduce the chelate groups into the polymer electrolyte materials; and Examples 6 to 13 were prepared by forming chemical bonds between the chelate groups and the polymer electrolyte materials so as to introduce the chelate groups into the polymer electrolyte materials.

EXAMPLE 1

The Sulfonic Acid Type Graft Membrane Doped with Poly(Vinylphosphonic Acid)

By the following procedures, the sulfonic acid type graft membrane was prepared. Under a presence of a dry ice cooler, the ethylene-tetrafluoroethylene copolymer membrane (referred to as "the ETFE membrane" hereinafter) having a thickness of 50 μm and a size of 50 mm×50 mm, was irradiated with an electron ray of 2 MeV, 20 kGy. As a result, radicals were produced at the internal parts of the ETFE membrane.

The resulting ETFE membrane was preserved under a presence of a dry ice cooler, then its temperature was risen to a room temperature again. Subsequently, the resulting ETFE membrane was immediately immersed in an excess amount of a styrene monomer, thereby nitrogen exchange was performed in a reaction vessel, for subsequent heat treatment under conditions of 60° C.×60 hours, so that the polystyrene graft chains might be introduced into the ETFE membrane. After the reaction, a reflux process was carried out with using chloroform thereby non-graft components (styrene monomer and homopolymer) were extracted and eliminated. Then, the resulting ETFE membrane was dried under a reduced pressure at a temperature of 80° C., thereby the ETFE-graft-polystyrene membrane (referred to as "the ETFE-g-PSt membrane" hereinafter) having a graft ratio of 85.6% was prepared.

Next, the resulting ETFE-g-PSt membrane was immersed in a mixture solution composed of 30 part weight (referred to as "pts. wt." hereinafter) of chlorosulfuric acids and 70 pts. wt. of tetrachloroethane for 1 hour under a room temperature so that chlorosulfuric acids might be introduced into every styrene unit of the membrane. After the reaction, the resulting membrane was washed with ethanol so as to remove the unreacted components. Thereby, the ETFE-g-PSt membrane with chlorosulfuric groups introduced, was prepared.

Then, the resulting membrane was immersed in 1 N potassium hydroxide aqueous solution, then a reflux process was performed under heating for 1 hour so as to hydrolyze chlorosulfuric acids. Furthermore, a boiling treatment was performed with 1 N of sulfuric acid for 1 hour so that the proton exchange of sulfonic acid groups might be performed. The resulting membrane was washed with distilled water, then was dried under a reduced pressure at a temperature of 80° C. Thereby the sulfonic acid type ETFE-g-PSt membrane having an equivalent weight of 410 g/eq was prepared. A graft ratio of the resulting sulfonic acid type ETFE-g-PSt membrane was found by the following Expression 1:

$$\text{A graft ratio } (\%) = (W_{ETFE\text{-}g\text{-}Pst} - W_{ETFE}) \times 100 / W_{ETF} \quad \text{Expression 1}$$

Where $W_{ETFE\text{-}g\text{-}Pst}$ is defined as a weight (g) of membrane after the graft reaction, and $W_{ETFE}$ is defined as a weight (g) of membrane before the graft reaction.

By the following procedures, an equivalent weight EW was measured. 0.1 to 0.2 g of the dried membrane was immersed in 20 ml of 0.1 N sodium hydroxide aqueous solution for 12 hours under a room temperature so that sulfonic acid groups in the membrane might be exchanged for sodium. Simultaneously, a blank was also prepared with using aqueous solution of sodium hydroxide in which the membrane was not immersed.

After immersion, the resulting membrane was pulled up from aqueous solution of sodium hydroxide, then was washed with distilled water. The washing solution was added to the solution for use in immersion to prepare a test specimen for titration. By using an automatic titration device (Comtite T-900 available from HIRANUMA), the test specimen and the blank were titrated with 0.5 N hydrochloric acids. An titration end-point was found based on an inflection point of a titration curve. A value EW of the membrane was found by the following Expression 2:

$$EW(\text{g/eq}) = W/(Q_{blank} - Q_{example})/1000 \times 0.5 \times F_{HCl} \quad \text{Expression 2}$$

Where

W is defined as a weight of membrane (g), $Q_{blank}$ is defined as a titer (ml) for the blank test specimen, $Q_{example}$ is defined as a titer (ml) for the test specimen, and, $F_{HCl}$ is defined as a titer of 0.5 N of HCl.

Then, the resulting sulfonic acid type ETFE-g-PSt membrane was immersed in an excess amount of 10% poly (vinylphosphonic acid) aqueous solution (available from General Science Corp.), followed by the reflux process under heating for 1 hour. After the treatment, the resulting membrane was washed with water and dried under a reduced pressure. Thereby the sulfonic acid type ETFE-g-PSt membrane doped with poly(vinylphosphonic acid) by 10 wt %. A mole fraction of the chelate group was 0.28 and a thickness of the resulting membrane was 80 μm.

Comparison Example 1

The Sulfonic Acid Type Graft Membrane

The sulfonic acid type graft membrane having an equivalent weight of 410 g/eq was prepared following the same procedures as in Example 1, except that doping with poly (vinylphosphonic acid) was not performed. The resulting membrane has the following Chemical formula (I) of:

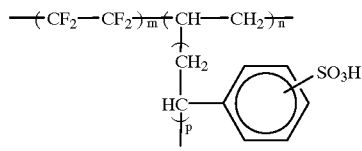

Chemical formula (I)

where a mole fraction of the chelate groups was 0, and a thickness of the resulting membrane was 77 μm.

Evaluation of the oxidation resistance was conducted with respect to the sulfonic acid type ETFE-g-PSt membrane doped with poly(vinylphosphonic acid) of Example 1, and the sulfonic acid type ETFE-g-PSt membrane of Comparison example 1. Firstly, approximately 100 mg of each electrolyte membrane was added in 50 ml of 3% hydrogen peroxide solution, followed by addition of 20 ppm of iron (II) chloride, subsequently, a reflux process was performed under heating for a given time. Then, each resulting membrane was weighted, and evaluated on the basis of the weight variation between before and after the reflux process. The results are shown in Table 1.

TABLE 1

| Period of time for | Weight keeping ratio (%) | | |
|---|---|---|---|
| oxidation resistance test | 10 minutes | 1 hour | 2 hours |
| Example 1 | 100 | 95 | 95 |
| Comparison example 1 | 38 | 38 | 38 |

The sulfonic acid type ETFE-g-PSt membrane (Comparison example 1) decomposed after 10 minutes passed from starting the oxidation resistance test, therefore, its weight was reduced to 38% of an initial weight. The resulting membrane after the oxidation resistance test was such that hydrocarbon chains (polystyrene graft chains) were entirely decomposed due to oxidation and degradation.

On the contrary, the sulfonic acid type ETFE-g-PSt membrane doped with poly(vinylphosphonic acid) (Example 1) showed little change in weight even though the same procedures as in Comparison example 1 was performed for 2 hours. The resulting membrane maintained the transparent and uniform condition.

Based on the aforementioned results, it was indicated that the oxidation resistance of the hydrocarbon-based electrolyte membrane was improved when the hydrocarbon-based electrolyte membrane was doped with the components containing phosphonic acids.

Comparison Example 2

The Sulfonic Acid Type Polyether Sulfone Membrane 10 g of polyether sulfone (available from Scientific Polymer Products, Inc., referred to as "PES" hereinafter) was added to 10 ml of concentrated sulfuric acids followed by drop of 90 g of chlorosulfuric acids (18 times as much as polyether sulfone acids) for 2 hours in nitrogen gas current under a room temperature. Subsequently, reaction was performed for 1 hour under a room temperature. After the reaction, the resulting solution, which became uniform due to the reaction, was dropped into 3 l of distilled water so that the sulfonated PES might be deposited. The deposited sulfonated PES was filtered and recovered.

Furthermore, the recovered sulfonated-PES was refluxed by using 1 N potassium hydroxide aqueous solution under heating for 1 hour, thereby being entirely hydrolyzed. Subsequently, the resulting sulfonated-PES was refluxed by using 1 N hydrochloric acids under heating for 1 hour, so that the proton-exchange might be performed. After washing with distilled water, the resulting sulfonated-PES was dried under a reduced pressure at a temperature of 80° C., thereby the sulfonated-PES was prepared.

Next, a glass plate was coated with 5% DMF solution of the resulting sulfonated-PES, then the coated glass plate was dried under a reduced pressure at a temperature of 150° C., so as to evaporate solvent and to form membrane. As a result, the desired sulfonic type PES membrane having an equivalent weight of 2000 g/eq was prepared.

EXAMPLE 2

The Phosphonic Acid Type Polyether Sulfone/ Sulfonic Acid Type Polyether Sulfone Blend Membrane 10 g of PES was added to 100 ml of carbon disulfide followed by addition of 150 ml chloromethylmethylether and 10 g anhydrous zinc chloride, then reaction was performed for 4 hours under a room temperature, so that chloromethyl groups might be introduced into every phenyl unit. After the reaction, the resulting solution which became uniform due to the reaction, was dropped into 3 l of methanol, so that the chloromethylated PES might be deposited. The deposited chloromethylated-PES was filtered and recovered. After repeating this washing process for 3 times, the resulting chloromethylated-PES was dried under a reduced pressure at a temperature of 80° C., thereby the desired chloromethylated-PES was prepared.

5% diethyl carbitol of chloromethylated PES (referred to as "DEC" hereinafter) solution was dropped into the mixture solution composed of equivalent amount of triethyl phosphite (referred to as "TEP" hereinafter) and DEC, followed by reaction for 2 hours. After the reaction, the reaction solution was dropped into hexane, so that the phosphonated PES might be deposited. The deposited phosphonated-PES was filtered and recovered. The recovered phosphonated-PES was refluxed by using 10 N hydrochloric acids under heating for 24 hours, thereby being entirely hydrolyzed. After washing with distilled water, the resulting phosphonated-PES was dried under a reduced pressure at a temperature of 80° C., thereby the desired phosphonated-PES was prepared.

5% dimethyl formamide of 1000 g/eq phosphonated-PES (referred to as "DMF" hereinafter) solution was prepared and mixed with 5% DMF of 2000 g/eq sulfonated-PES in Comparison example 2 in a ratio of 1:1, with which a glass plate was coated. Then, the coated glass plate was dried under a reduced pressure at a temperature of 150° C. so as to eliminate solvent and to form membrane. Thereby, the phosphonic acid type polyether sulfone/sulfonic acid type polyether sulfone blend membrane was prepared. Where, a mole fraction of the chelate groups was 0.5, and a thickness of the membrane was 50 μm.

EXAMPLE 3

The Poly(Vinylphosphonic Acid)/Sulfonic Acid Type Polyether Sulfone Blend Membrane 5% DMF of poly vinyl sulfonic acids used in Example 1 was blended with 5% DMF of sulfonated-PES prepared by following the same procedures as in Comparison example 2 in the ratio of 1:1. Then, a glass plate was coated with the resulting mixture solution. The coated glass plate was then dried under a reduced pressure at a temperature of 150° C. so as to eliminate solvent and to form membrane. Thereby, the poly(vinylphosphonic acid)/sulfonic acid type polyether sulfone blend membrane was prepared. Where, a mole fraction of the chelate groups was 0.95, and a thickness of the membrane was 50 μm.

Comparison Example 3

The Sulfonic Acid Type Polyether Ether Ketone Membrane

The sulfonic acid type polyether ether ketone (referred to as "PEEK" hereinafter) membrane having an equivalent weight of 1900 g/eq was prepared following the same procedures as in Comparison example 2, except for the use of PEEK instead of PES. Where, a mole fraction of the chelate groups was 0, and a thickness of the membrane was 50 μm.

EXAMPLE 4

The Phosphonic Acid Type Polyether Ether Ketone/ Sulfonic Acid Type Polyether Ether Ketone Blend Membrane The phosphonic acid type PEEK membrane having an equivalent weight of 1000 g/eq was prepared following the same procedures as in Example 2, except for the use of PEEK instead of PES. 5% DMF of the phosphonic acid type PEEK was mixed with 5% DMF of sulfonic acid type PEEK in Comparison example 3 in the ratio of 1:1. Then, a glass plate was coated with the resulting mixture solution. The coated glass plate was then dried under a reduced pressure at a temperature of 150° C. for the purpose of eliminating solvent and forming the membrane product. As a result, the phosphonic acid type polyether ether ketone/sulfonic acid type polyether ether ketone blend membrane was obtained. Where, a mole fraction of the chelate groups was 0.49, and a thickness of membrane was 50 μm.

EXAMPLE 5

The Poly Vinylphosphonic Acid)/Sulfonic Acid Type Polyether Ether Ketone Blend Membrane 5% DMF solution of poly(vinylphosphonic acid) used in Example 1 was blended with 5% DMF solution of sulfonic acid type PEEK obtained by Comparison example 3 in the ratio of 1:1, with which a glass plate was coated. Then, the coated glass plate was dried under a reduced pressure at a temperature of 150° C. so as to eliminate solvent and to form membrane. Thereby, the poly(vinylphosphonic acid)/ sulfonic acid type polyether ether ketone blend membrane was prepared. Where, a mole fraction of the chelate groups was 0.94, and a thickness of the membrane was 50 μm.

The oxidation resistance test was performed with respect to the sulfonic acid type polymer membrane blended with the polymer components containing phosphonic acid groups in Examples 2 to 5, and the sulfonic acid type polymer membrane in Comparison examples 2 and 3, following the same procedures as in Example 1. The results are shown in Table 2.

TABLE 2

| Test specimen COMPOSITION | *A mole fraction | Weight keeping ratio (%) (Period of time for oxidation resistance test) | | |
|---|---|---|---|---|
| | | 10 min. | 1 hr. | 2 hr. |
| Example 2 sulfonic acid type PES/phosphonic acid type PES | 0.5 | 100 | 95 | 95 |
| Example 3 sulfonic acid type PES/poly(vinyl-phosphonic acid) | 0.95 | 100 | 95 | 80 |
| Comparison example 2 sulfonic acid type PES | 0 | — | — | ** |
| Example 4 sulfonic acid type PEEK/phosphonic acid type PEEK | 0.49 | 100 | 95 | 80 |
| Example 5 sulfonic acid type PEEK/poly(vinyl-phosphonic acid) | 0.94 | 100 | 90 | 80 |
| Comparison example 3 sulfonic acid type PEEK | 0 | — | — | ** |

*A mole fraction of chelate groups
** decomposed and dissolved

Based on the results as shown in Table 2, each proton conductivity of all the membrane in Examples 1 to 5 and Comparison examples 1 to 3 was more than or equal to 0.02 S/cm. The sulfonic acid type polymer membrane containing no phosphonic acid type polymer components (Comparison examples 2 and 3) decomposed and dissolved in water after 2 hours passed from starting the oxidation resistance test. In case of the sulfonic acid type polymer membrane blended with the phosphonic, acid type polymer components (Examples 2, 3, 4 and 5) where a mole fraction of chelate groups was within a range of 0.49 to 0.95, a weight keeping ratio (%) was 80 to 95% after 2 hours passed from starting the oxidation resistance test. It was indicated that the weight keeping ratio (%) was higher than that of the sulfonic acid type polymer membrane (Comparison examples 2 and 3).

EXAMPLE 6

The Phosphonic Acid Type Electrolyte Membrane

The ETFE-g-PSt membrane prepared by following the same procedures as in Example 1, was immersed in a mixture solution composed of 30 pts. wt. of chloromethylmethylether and 70 pts. wt. of carbon disulfide followed by addition of 3 pts. wt. of anhydrous zinc chloride, so as to react them for 240 hours under a room temperature with stirring, thereby chloromethyl groups were introduced into every styrene unit of the membrane. After the reaction, the resulting membrane was washed with ethanol and dried under a reduced pressure at a temperature of 80° C. Thereby the chloromethylated ETFE-g-PSt membrane was prepared.

Next, the chloromethylated ETFE-g-PSt membrane was immersed in an excess amount of triethyl phosphate, then was refluxed under heating for 24 hours so that diethyl phosphonate groups might be introduced into every chloromethylstyrene unit. After the reaction, the resulting membrane was washed with ethanol and dried under a reduced pressure at a temperature of 80° C. Thereby the diethylphosphonated ETFE-g-PSt membrane was prepared.

Furthermore, the resulting diethylphosphonated ETFE-g-PSt membrane was refluxed in 10 N hydrochloric acids for 24 hours, so that diethylphosphonate groups might be entirely hydrolyzed. After reaction the resulting phosphonic acid type ETFE-g-PSt membrane was washed with distilled water, then was dried under a reduced pressure at a temperature of 80° C. Thereby the desired phosphonic acid type ETFE-g-PSt membrane was prepared. A thickness of the membrane was 80 μm.

In order to evaluate the resulting membrane, a graft ratio, a phosphonic acid-introducing ratio, and a conductivity were measured. Furthermore, the oxidation resistance was evaluated with respect to the resulting membrane. Where, a graft ratio was found by above identified Expression 1.

Furthermore, phosphonic acid groups are introduced quantitatively into every chloromethylstyrene unit. Therefore, a chloromethylation ratio of styrene was found based on weight variation between before and after the reaction. A introducing ratio which defines the ratio that phosphonic acids are introduced into styrene unit of the membrane was found by the following Expression 3:

$$\text{A phosphonic acid introducing ratio (\%)} = 100 \times (W - W_{PSt}) \times 104 / (W_{PSt} - W_{ETFE}) / 48.45 \quad \text{Expression 3}$$

Where,

W is defined as a weight of after chloromethylation (g), $W_{PSt}$ is defined as a weight of the polystyrene graft membrane (g), and $W_{ETFE}$ is defined as a weight of the ETFE membrane (g)

By the following procedures, a conductivity was measured. Firstly, the membrane was immersed in distilled water under a room temperature. The membrane was then cut off as to have a width of 1 cm, and mounted on a two-terminal cell for use in measuring a conductivity. As the current/voltage terminal, platinum foil coated with platinum black was employed for better contact between the terminal and the membrane. The cell was immersed in distilled water adjusted to 25° C., then a membrane resistance was measured with LCR meter (available from YHP Co., Ltd., 4262A LCR Meter) based on the alternating current method (10 kHz). A conductivity (σ) was found by the following Expression 4

$$\sigma = L/(R \times S) \quad \text{Expression 4}$$

Where,

σ is defined as a conductivity (S/cm),

R is defined as a resistance (Ω),

S is defined as a sectional area of a membrane during measurement (cm$^2$), and

L is defined as a distance between electrodes (cm)

Then, each membrane was immersed in hydrogen peroxide solution prepared respectively in compliance with Conditions A to C shown in Table 3. The immersed membrane was then refluxed under heating for a given time, and then washed and dried under a reduced pressure. Each resulting membrane was weighed and its conductivity was measured. Based on the measured values, a weight keeping ratio and a conductivity keeping ratio were found in order to evaluate the oxidation resistance.

TABLE 3

| Conditions | Preparation |
|---|---|
| A | 50 ml of 5% $H_2O_2$ aqueous solution per 100 mg of membrane Treatment: 7 hours under a reflux temperature |

TABLE 3-continued

Conditions Preparation

B   50 ml of 3% $H_2O_2$ aqueous solution + 20 ppm of iron (II) chloride, per 100 mg of membrane
Treatment: 2 hours under a reflux temperature C   50 ml of 3% $H_2O_2$ aqueous solution + 20 ppm of iron (II) chloride, per 100 mg of membrane
Treatment: 20 minutes under a reflux temperature

EXAMPLE 7

The Sulfonic Acid Type Electrolyte Membrane Partially-Introducing Phosphonic Acid Groups The ETFE-g-PSt membrane prepared by following the same procedures as in Example 1, was immersed in a mixture solution composed of 30 pts. wt. of chloromethylmethylether and 70 pts. wt. of carbon disulfide, followed by addition of 3 pts. wt. of anhydrous zinc chloride so as to react them for 194 hours under a room temperature with stirring, thereby chloromethyl groups were introduced into in part of every styrene unit of the membrane. After the reaction, the resulting membrane was washed with ethanol and dried under a reduced pressure at a temperature of 80° C. Thereby the partially-chloromethylated ETFE-g-PSt membrane was prepared.

Next, the partially-chloromethylated ETFE-g-PSt membrane was immersed in an excess amount of triethyl phosphate, then was refluxed under heating for 24 hours so that diethyl phosphonate functional groups might be introduced into every chloromethylstyrene unit. After the reaction, the resulting membrane was washed with ethanol and dried under a reduced pressure at a temperature of 80° C. Thereby, the partially-diethylphosphonated ETFE-g-PSt membrane was prepared.

The resulting partially-diethylphosphonated ETFE-g-PSt membrane was immersed in a mixture solution composed of 30 pts. wt. of chlorosulfuric acids and 70 pts. wt. of tetrachloroethane for 1 hour under a room temperature, so that chlorosulfuric acid groups might be introduced into such styrene units that were not diethylphosphonated. After reaction, the resulting membrane was washed with distilled water. Thereby the ETFE-g-PSt membrane introducing both of diethylphosphonate groups and chlorosulfuric acid groups was prepared.

The resulting membrane was immersed in 1 N potassium hydroxide aqueous solution, then was refluxed under heating for 1 hour, so that chlorosulfuric acid groups might be hydrolyzed. Furthermore, after washing with distilled water, the resulting membrane was refluxed in 10 N hydrochloric acids for 24 hours, so that diethylphosphonate groups might be hydrolyzed. After the reaction, the resulting membrane was washed with distilled water and dried under a reduced pressure at a temperature of 80° C. Thereby the sulfonic acid type ETFE-g-PSt membrane partially-introducing phosphoric acids was prepared.

With respect to the resulting sulfonic acid type ETFE-g-PSt membrane, a graft ratio, a phosphonic acid-introducing ratio and a conductivity were measured and evaluation was conducted, following the same procedures as in Example 1. Furthermore, referring to the results that were examined by the inventors, the sulfonic acid groups were introduced approximately quantitatively into every styrene unit. Therefore, a sulfonic acid-introducing ratio for a styrene unit of membrane was found by the following Expression 5:

(A sulfonic acid-introducing ratio (%))=100−(A phosphonic acid-introducing ratio (%)).   Expression 5

EXAMPLES 8 TO 11

The phosphonic acid type ETFE-g-PSt membrane partially-introducing phosphonic acid were prepared as Examples 8 to 11 by differentiating an introducing amount of phosphonic acids, following the same procedures as in Example 2 except for a period of time for chloromethylation reaction, namely, 60 hours in Example 8, 48 hours in Example 9, 24 hours in Example 10 and 8 hours in Example 11 were adopted respectively. The resulting membrane was evaluated following the same procedures as in Examples 6 and 7, on the basis of the measured characteristics and the oxidation resistance.

With respect to each membrane prepared in Examples 6 to 11 and Comparison example 1, a graft ratio, a phosphonic acid-introducing ratio, a sulfonic acid-introducing ratio, a conductivity as well as a weight keeping ratio, a conductivity and a conductivity keeping ratio after the oxidation resistance test under Condition B shown in Table 3 are shown in Table 4.

TABLE 4

| | Graft ratio (%) | Phosphonic acid groups (%) | Sulfone acid groups (%) | Conductivity (S/cm) | After oxidation resistance test under Condition B | | |
|---|---|---|---|---|---|---|---|
| | | | | | Weight keeping ratio (%) | Conductivity (S/cm) | Conductivity keeping ratio (%) |
| Example 6 | 92.0 | 89 | 0 | 0.012 | 98 | 0.012 | 100 |
| Example 7 | 95.2 | 89 | 11 | 0.056 | 94 | 0.056 | 100 |
| Example 8 | 94.2 | 59 | 41 | 0.078 | 80 | 0.078 | 100 |
| Example 9 | 83.2 | 47 | 53 | 0.109 | 70 | 0.101 | 93 |
| Example 10 | 100.8 | 36 | 64 | 0.105 | 51 | * | 0 |
| Example 11 | 91.8 | 7 | 93 | 0.145 | 46 | * | 0 |
| Comparison example 1 | 85.6 | 0 | 100 | 0.182 | 38 | * | 0 |

*below the measuring limit

The sulfonic acid type ETFE-g-PSt membrane (Comparison example 1) has such structure that electrolyte is composed of only sulfonic acid groups, therefore, an initial conductivity was as high as 0.182 S/cm. However, a weight of membrane after the oxidation resistance test was reduced to 38% of an initial weight with the decrease of a conductivity below a lower measuring limit. The resulting membrane after the oxidation resistance test were such that hydrocarbon chains (polystyrene graft chains) were entirely decomposed due to oxidation and degradation.

On the contrary, an initial conductivity of the phosphonic acid type ETFE-g-PSt membrane (Example 6) was as low as 0.012 S/cm, because phosphonic acid groups is weaker than sulfonic acid groups. But there was no change in the weight and conductivity of the membrane after the oxidation resistance test.

In the case of the sulfonic acid type ETFE-g-PSt membrane partially-introducing phosphonic acid groups (Examples 7 to 11), it was indicated that when an introducing amount of phosphonic acid groups was increased, then the decrease of weight and the deterioration of conductivity after the oxidation resistance test could be suppressed.

With respect to Examples 10 and 11 and Comparison example 4 in which each conductivity was below the measuring limit, the oxidation resistance test was conducted under the lightened condition (under Condition C where a period of time for reflux process is shortened as shown in Table 1), in order to clear the difference among each oxidation resistance. The results are shown in Table 5.

as high as 0.18 S/cm, but the membrane was entirely decomposed when approximately 10 minutes passed from starting the oxidation resistance test as is indicated by the weight variation and the conductivity variation.

On the contrary, in the phosphonic acid type ETFE-g-PSt membrane (Example 6), an initial conductivity was as low as 0.012 S/cm. The membrane, however, was not affected by decomposition and degradation due to hydrogen peroxide solution. Accordingly, the membrane maintained more than or equal to 90% of both a weight and a conductivity after 7 hours passed from starting the oxidation resistance test.

The membrane introducing phosphonic acid groups and sulfonic acid groups in the ratio of 59:41 by mole (Example 8) showed an initial conductivity higher than that of Nafion membrane (0.078 S/cm for Example 3, 0.072 S/cm for Nafion membrane), and maintained its value higher than or equal to 90% after 7 hours passed from starting the oxidation resistance test.

TABLE 5

|  | Graft ratio (%) | Phosphonic acid groups (%) | Sulfone acid groups (%) | Conductivity (S/cm) | After oxidation resistance test under Condition C | | |
| --- | --- | --- | --- | --- | --- | --- | --- |
|  |  |  |  |  | Weight keeping ratio (%) | Conductivity (S/cm) | Conductivity keeping ratio (%) |
| Example 10 | 100.8 | 36 | 64 | 0.105 | 100 | 0.105 | 100 |
| Example 11 | 91.8 | 7 | 93 | 0.145 | 85 | 0.145 | 100 |
| Comparison example 1 | 85.6 | 0 | 100 | 0.182 | 38 | * | 0 |

*below the measuring limit

In the case of Comparison example 1 containing no phosphonic acid groups, even though the oxidation resistance test was performed under the lightened Condition C, then a weight keeping ratio was reduced to 38% due to oxidation and a conductivity reached below the measuring limit. On the contrary, in the case of Example 11 wherein 7 mol % of phosphonic acid groups were introduced, a weight keeping ratio was 85% and a conductivity keeping ratio was 100%. Furthermore, Example 10 wherein 36 mol % of phosphonic acid groups were introduced, both of a weight keeping ratio and a conductivity keeping ratio were 100%, therefore oxidation and degradation were not recognized.

Based on the aforementioned results, it was indicated that when phosphonic acid groups were introduced into polymer compounds containing hydrocarbon part, then the decrease of weight and the degradation of conductivity could be suppressed. Accordingly, it was indicated that the oxidation resistance of polymer electrolyte membrane could be improved with an increase of an introducing mount of phosphonic acid groups.

Figure 2:
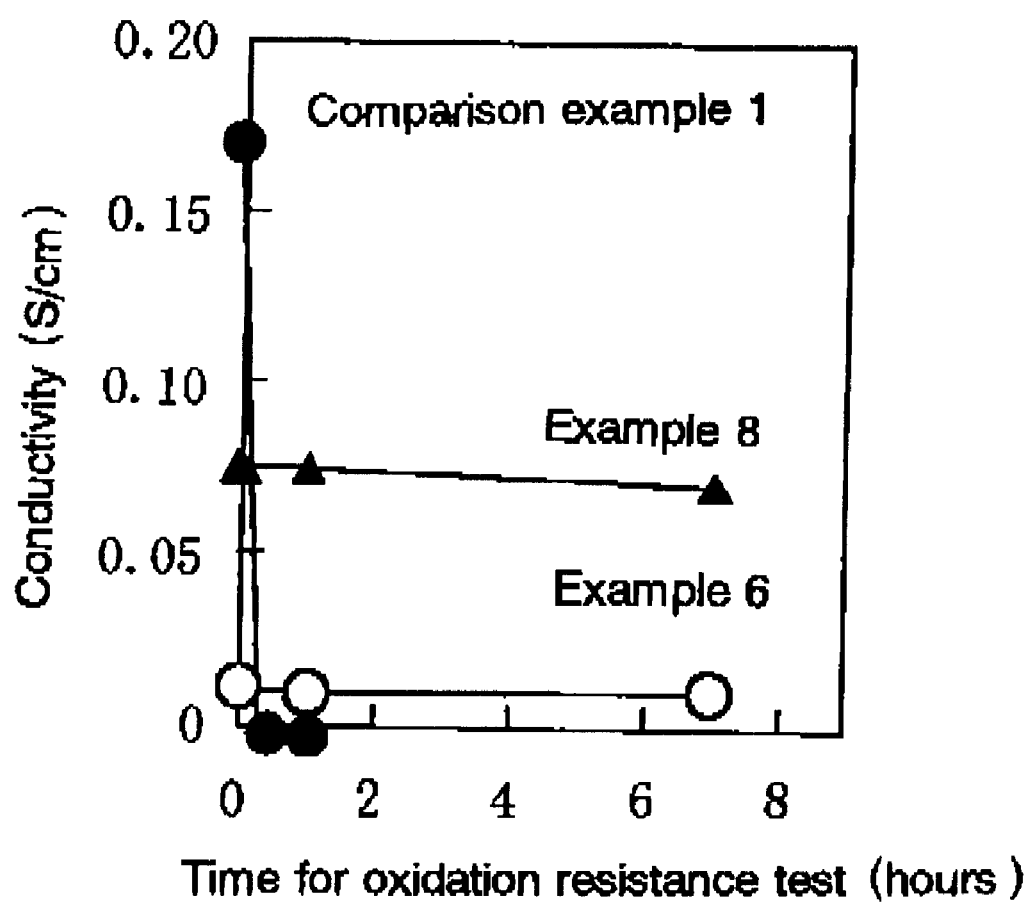
FIG. 2 is a graph showing a conductivity in S/cm varying with time in the case of the heating and reflux treatment for various solid polymer electrolyte in hydrogen peroxide solution.

Next, the oxidation resistance test was performed under Condition A shown in Table 3, with respect to the phosphonic acid type ETFE-g-PSt membrane (Example 6), the sulfonic acid type ETFE-g-PSt membrane partially-introducing phosphonic acid groups (Example 8), and the sulfonic acid type ETFE-g-PSt membrane (Comparison example 1). The weight variations with time were measured. The results are shown in FIG. 1. The conductivity variations with time are shown in FIG. 2.

In the case of the sulfonic acid type ETFE-g-PSt membrane (Comparison example 1), an initial conductivity was

EXAMPLE 12

The Sulfonic Acid Type ETFE-g-PSt Electrolyte Membrane Introducing Amino Dimethylene Phosphonic Acid Groups as the Chelate Groups Following the same procedures as in Example 1, the ETFE-g-PSt membrane was prepared so that a graft ratio might be 54%. The ETFE-g-PSt membrane of a graft ratio of 54% was then immersed in a mixture solution comprised of 30 pts. wt. of chloromethylmethylether and 70 pts. wt. of carbon dioxide followed by addition of 3 pts. wt. of zinc chloride anhydride, so as to react them for 194 hours with stirring under a room temperature. After the reaction, the resulting membrane was washed with ethanol, then was dried under a reduced pressure at a temperature of 80° C., so that chloromethyl groups might be introduced into part of styrene units. Thereby the ETFE-g-PSt membrane was prepared where a graft ratio was 54% and a value found by dividing "a number of chloromethylated styrene units" by "a number of introduced styrene units" was 0.254.

The ETFE-g-PSt membrane wherein a graft ratio was 54% and 25.4% of styrene units was chloromethylated, was then immersed in 300 ml of methylal for 1 hour. Subsequently, 340 mg of 55% hexamethylenetetramine aqueous solution was added to the reaction vessel, then reflux process was performed under conditions of 45° C.×4 hours. The resulting membrane was pulled up and washed with water, then was immersed in 500 g of 18% concentration of hydrochloric acids aqueous solution, thereby being hydrolyzed for 3 hours under 45° C.

Next, the resulting membrane was pulled up and washed with water, then was immersed in 125 g of 37% concentration of formaldehyde aqueous solution, followed by addition of 150 g of phosphorous acids and 100 g of 35% concentration of hydrochloric acids, then was held for 8 hours at 90° C. The resulting membrane was pulled up and washed with water, then was immersed in a mixture solution composed of 30 pts. wt. of chlorosulfuric acids and 70 pts. wt. of tetrachloroethane for 1 hour under a room temperature. Thereby chlorosulfuric acids were introduced into styrene units to which amino dimethylene phosphonic acid groups were not introduced. After the reaction, the resulting membrane was washed with ethanol. Thereby the sulfonic acid type ETFE-g-PSt membrane was prepared, where a graft ratio was 54% and amino dimethylene phosphonic acid groups were introduced into 25.4% of styrene units.

EXAMPLE 13

The Sulfonic Acid Type ETFE-g-PSt Electrolyte Membrane Introducing Amino Diacetic Acid Groups as the Chelate Groups Following the same procedure as in Example 1, the ETFE-g-PSt membrane was prepared so that a graft ratio might be 54%. The ETFE-g-PSt membrane of a graft ratio of 54% was then immersed in a mixture solution comprised of 30 pts. wt. of chloromethylmethylether and 70 pts. wt. of carbon dioxide, followed by addition of 3 pts. wt. of zinc chloride anhydride, so as to react them for 194 hours with stirring under a room temperature. After the reaction, the resulting membrane was washed with ethanol, and then was dried under a reduced pressure at a temperature of 80° C., so that chloromethyl groups might be introduced into part of styrene units. Thereby the ETFE-g-PSt membrane was prepared, where a graft ratio was 54 and a value found by dividing "a number of chloromethylated styrene units" by "a number of introduced styrene units" was 0.254.

The ETFE-g-PSt membrane wherein a graft ratio was 54 and 25.4% of styrene units was chloromethylated, was then immersed in 300 ml of methylal for 1 hour. Subsequently, 340 mg of 55% hexamethylenetetramine aqueous solution was added to the reaction vessel, then reflux process was performed under conditions of 45° C.×4 hours. The resulting membrane was pulled up and washed with water, then was immersed in 500 g of 18% concentration of hydrochloric acids aqueous solution, thereby being hydrolyzed for 3 hours under 45° C. These procedures are the same as in Example 12.

The resulting membrane after a treatment with using hexamethylenetetramine was added to a mixture solution comprised of 300 g of 35% NaOH aqueous solution and 35% sodium chloroacetic acid aqueous solution, then was held for 5 hours at 90° C. After washing with water, the resulting membrane was immersed in a mixture solution comprised of 30 pts. wt. of chlorosulfuric acid and 70 pts. wt. of tetrachloroethane for 1 hour under a room temperature, so that chlorosulfuric acid group might be introduced into styrene units to which amino diacetic acid groups were not introduced. After the reaction, the resulting membrane was washed with ethanol. Thereby the sulfonic acid type ETFE-g-PSt membrane was prepared, where a graft ratio was 54% and amino diacetic acid groups were introduced into 25.4% of styrene units.

Comparison Example 4

For use in comparison with Example 12 and Example 13, the sulfonic acid type ETFE-g-PSt membrane with no introduction of the chelate groups was prepared so that a graft ratio might be 54% by a process of sulfonating the ETFE-g-PSt membrane, which is used in Example 12, having a graft ratio of 54% and being not chloromethylated yet.

The chemical formulas (II) show the chemical structures of the following compounds: the sulfonic acid type ETFE-g-PSt membrane introducing amino dimethylene phosphonic acid groups (the chelate groups) in Example 12; and the sulfonic acid type ETFE-g-PSt membrane introducing amino diacetic acid groups (the chelate groups) in Example 13.

Chemical Formulas (II)

The sulfonic acid type ETFE-g-PSt membrane introducing amino dimethylene phosphonic acid groups (the chelate groups) in Example 12

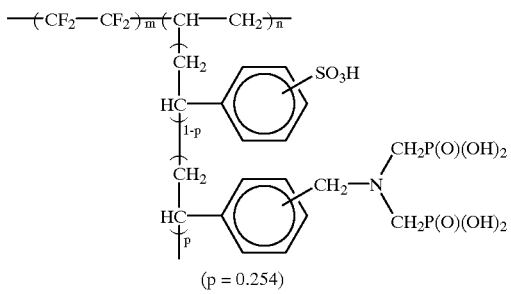

(p = 0.254)

The sulfonic acid type ETFE-g-PSt membrane introducing amino diacetic acid groups (the chelate groups) in Example 13.

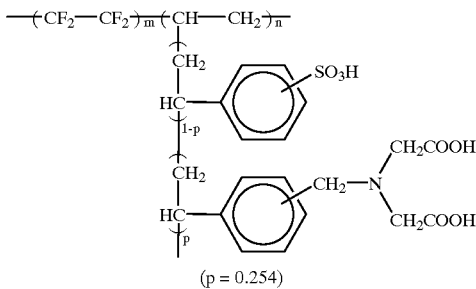

(p = 0.254)

With respect to the sulfonic acid type ETFE-g-PSt membrane introducing amino dimethylene phosphonic acid groups in Example 12, the sulfonic acid type ETFE-g-PSt membrane introducing amino diacetic acid groups in Example 13, and the sulfonic acid type ETFE-g-PSt membrane having a graft ratio of 54% in Comparison example 4, the oxidation resistance test was conducted by measuring a weight keeping ratio, a water content and a conductivity. The details will be described hereinafter. The oxidation resistance test was performed by immersing each electrolyte membrane in 100 ml of 3% hydrogen peroxide solution with additives of 2 ppm iron (II) chloride and then performing a reflux process.

Figure 3:
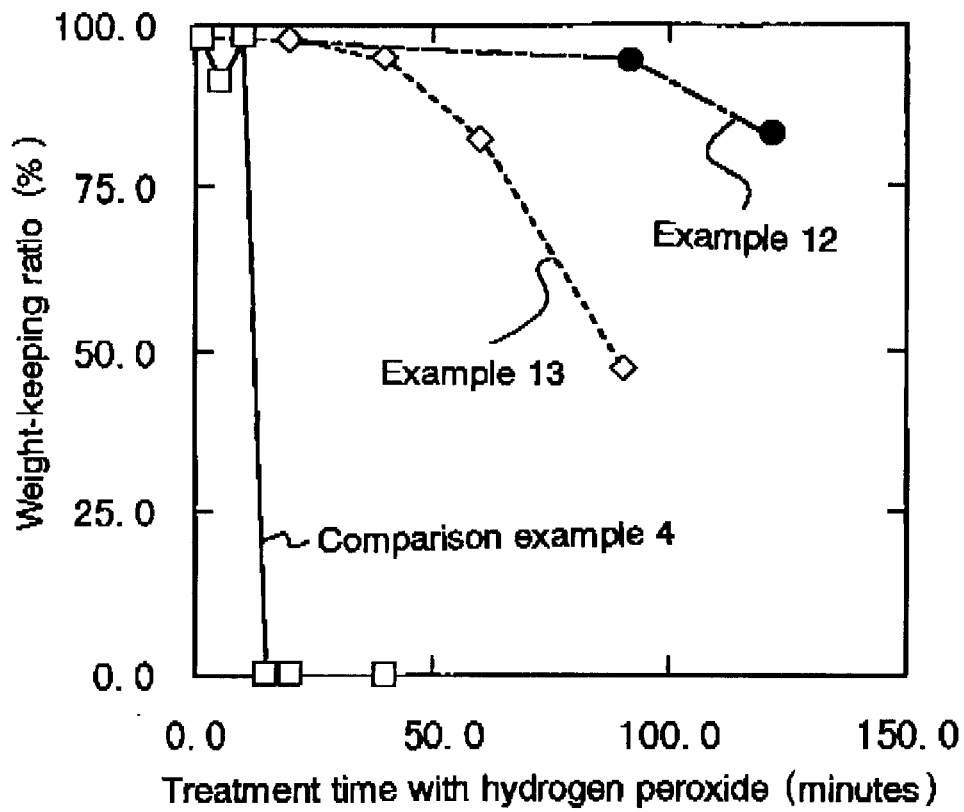
FIG. 3 is a graph showing a weight keeping ratio (%) of each electrolyte membrane varying with time elapsed from immersing in hydrogen peroxide solution, as a result of the oxidation resistance test for the sulfonic acid type ETFE-graft-polystyrene polymer electrolyte membrane introducing amino dimethylenephosphonic acid groups or introducing amino diacetic acid groups, in comparison with Comparison examples.

FIG. 3 shows the relation between a weight keeping ratio (%) and a period of time for treatment with hydrogen peroxide (min). A treatment time with hydrogen peroxide (min) is plotted on abscissa, and a weight keeping ratio (%) is plotted on ordinate. Based on the results shown in FIG. 1, the sulfonic acid type ETFE-g-PSt membrane in Comparison example 4, to which the chelate groups were not introduced, was reduced in weight after 10 minutes passed from starting immersion, and then entirely dissolved.

On the contrary, a degree of reduction in a weight keeping ratio (%) was not relatively large in the case of the sulfonic acid type ETFE-g-PSt membrane introducing amino dimethylene phosphonic acid groups in Example 12 and the sulfonic acid type ETFE-g-PSt membrane introducing amino diacetic acid groups in Example 13. Particularly, the sulfonic acid type ETFE-g-PSt membrane introducing amino dimethylene phosphonic acid groups in Example 12 showed satisfactory results because a weight keeping ratio thereof was remained at approximately constant for 100 minutes under condition of immersion in hydrogen peroxide solution.

The reason that the sulfonic acid type ETFE-g-PSt membrane introducing amino dimethylene phosphonic acid groups in Example 12 showed more excellent results than the sulfonic acid type ETFE-g-PSt membrane introducing amino diacetic acid groups in Example 13 is considered as following: a coordination power of the amino dimethylene phosphonic acid groups in Example 12 under coexistence with sulfonic acid groups, was more excellent than that of the amino diacetic acid groups in Example 13, so a trapping efficiency of metal ions (in this case $Fe^{2+}$), entering into an electrolyte membrane, was excellent. Additionally, the dimethylene phosphonic acid groups have the stronger power, which causes an electrolyte density to rise, than the amino diacetic acid groups. This fact contributed to improvement of the oxidation resistance in the point of its structure.

Figure 4:
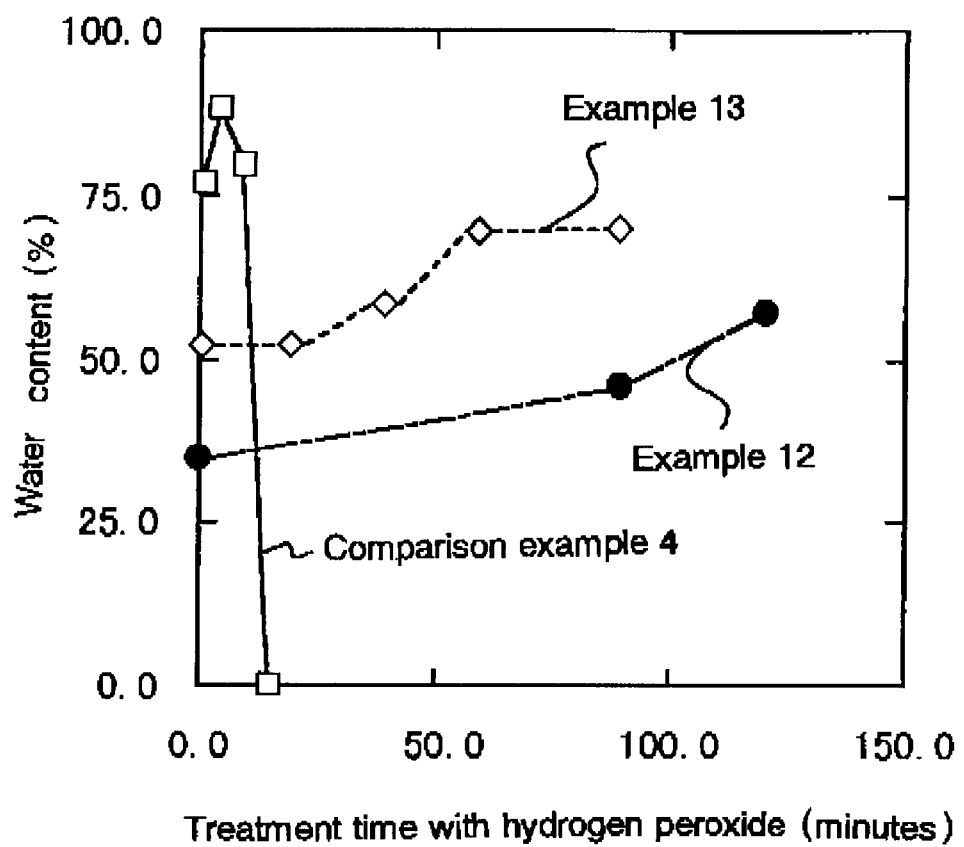
FIG. 4 is a graph showing a water content (%) of each electrolyte membrane varying with time elapsed from immersing in hydrogen peroxide solution, as a result of the oxidation resistance test shown in FIG. 3, in comparison with comparison examples.

FIG. 4 shows the relation between a water content (%) and a treatment time with hydrogen peroxide (min) with respect to Example 12, Example 13 and Comparison example 4. In respect of the water content variation, the electrolyte membrane in Example 12 and Example 13 were excellent. Particularly, Example 12 which introduces the amino dimethylene phosphonic acid groups showed a rise in a water content (%), but its degree was smaller than that of Example 13 which introduces the amino diacetic acids. Thereby it was indicated that Example 12 was more excellent than Example 13.

Figure 5:
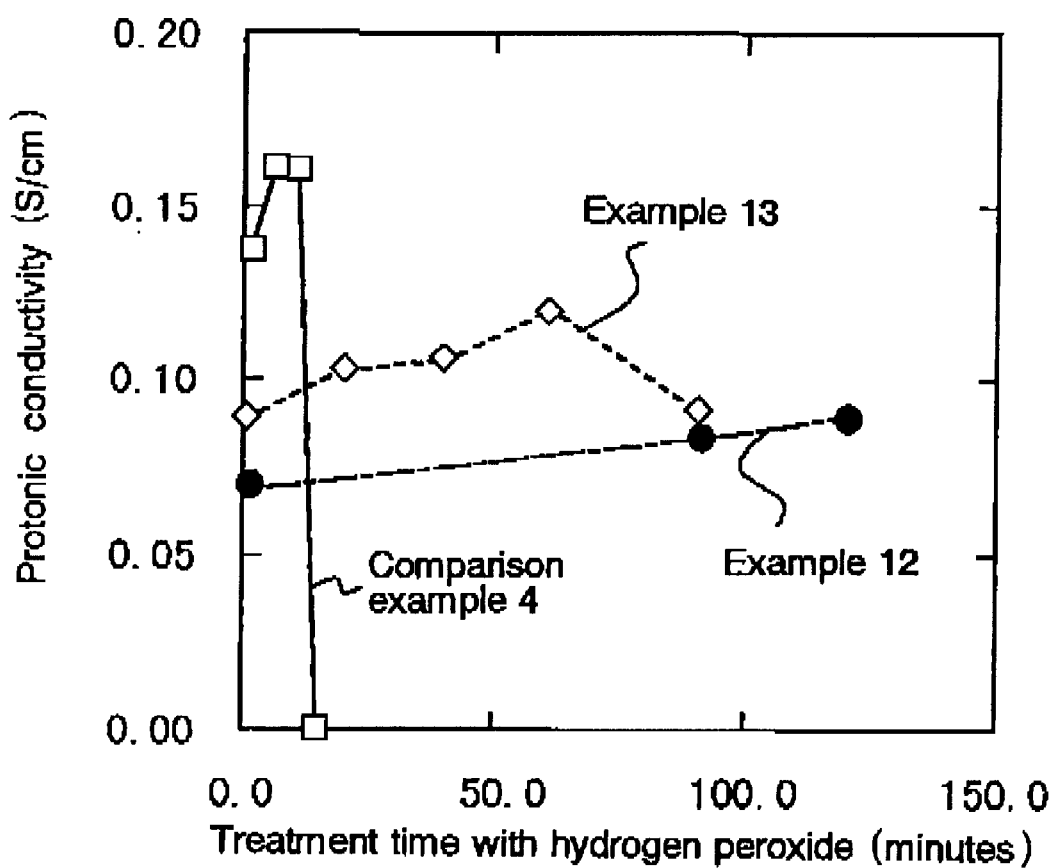
FIG. 5 is a graph showing a conductivity (S/cm) of each electrolyte membrane varying with time elapsed from immersing in hydrogen peroxide solution, as a result of the oxidation resistance test shown in FIG. 3, in comparison with Comparison examples.

FIG. 5 shows the relationship between a conductivity (S/cm) and a treatment time with hydrogen peroxide (min) with respect to Example 12, Example 13 and Comparison example 4. In the case of Example 12 and Example 13, there was no large change in a conductivity even if they were immersed in for a long period of time. Particularly, in the case of Example 12 prepared by introducing amino dimethylene phosphonic acids, there was no tendency for a conductivity to fall and irregularity was small, while the tendency was observed in Example 13. It was indicated that the results of Example 12 were more excellent than that of Example 13.

Figure 6:
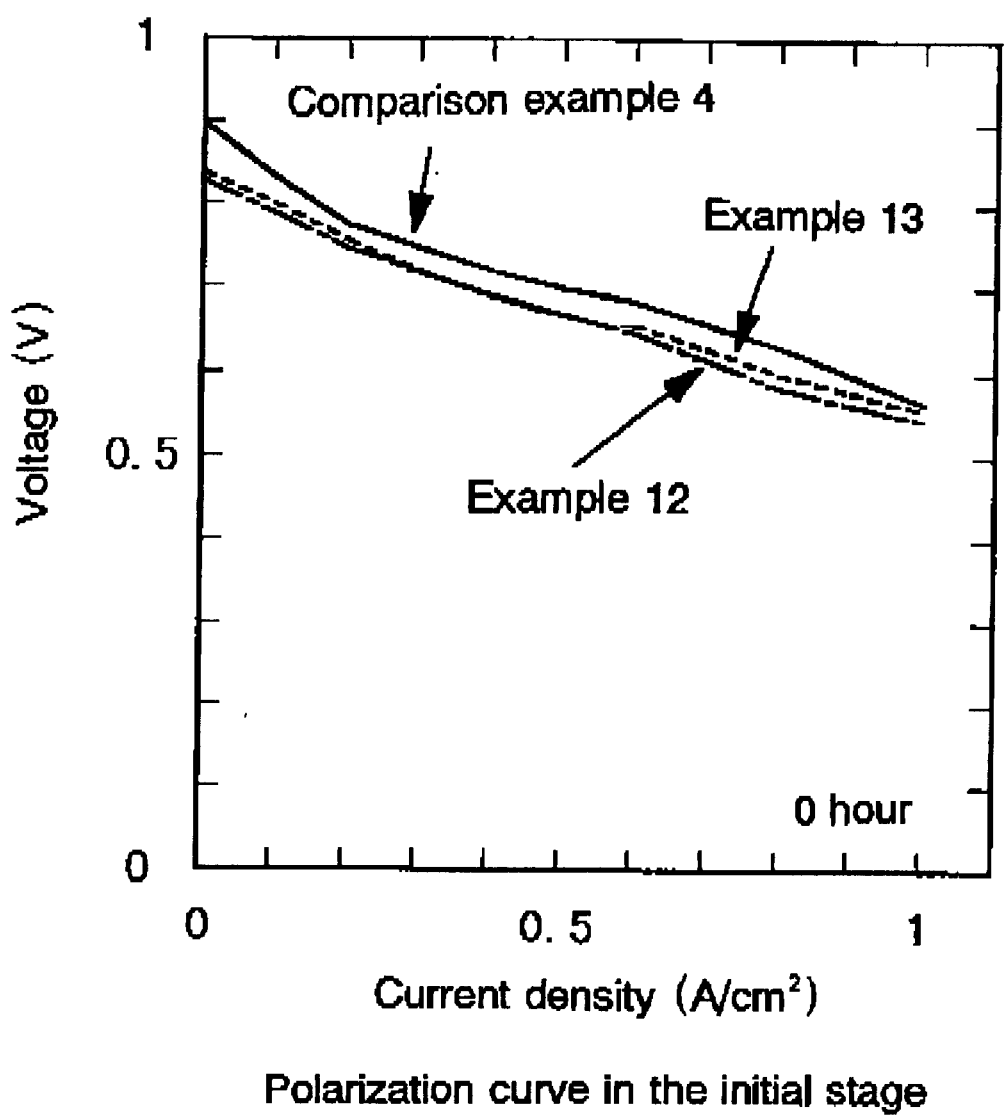
FIG. 6 is a graph showing a polarization characteristic (relation between a current density (A/cm$^2$) and a voltage (V)) during the initial stage of driving the fuel cell that uses the electrolyte membrane in consistent with the preferred embodiments shown in FIGS. 3 to 5.

Next, by using each electrolyte membrane in Example 12, Example 13 and Comparison example 4, the polymer electrolyte membrane fuel cells were respectively prepared. Then, the fuel cell properties were examined. The details of which will be described hereinafter. Driving conditions of each fuel cell were as following: 80° C. of an operating temperature of a fuel cell; 5 A/cm$^2$ of H$_2$ flow rate for supply to an anode; 4.4 A/cm$^2$ of O$_2$ flow rate for supply to a cathode; 85° C. of water bubbler for H$_2$; and 70° C. of water bubbler for air. Under the conditions, a voltage was measured with sweeping currents. FIG. 6 shows the polarization characteristic of each fuel cell (the relation between a current density and a voltage) during an initial stage of each fuel cell running at that time. A current density (A/cm$^2$) is plotted on abscissa, and a voltage (V) is plotted on ordinate.

Based on the result shown in FIG. 6, concerning the polarization characteristics during an initial stage, there was a tendency for a voltage (V) to decrease with the increase in a current density (A/cm$^2$) with respect to the sulfonic acid type ETFE-g-PSt membrane introducing amino dimethylenephosphonic acid groups in Example 12, the sulfonic acid type ETFE-g-PSt membrane introducing amino diacetic acid groups in Example 13, and the sulfonic acid type ETFE-g-PSt membrane having a graft ratio of 54% in comparison example 4. It was indicated that each example had almost nearly tendency, thus there was no difference in each fuel cell performance.

Figure 7:
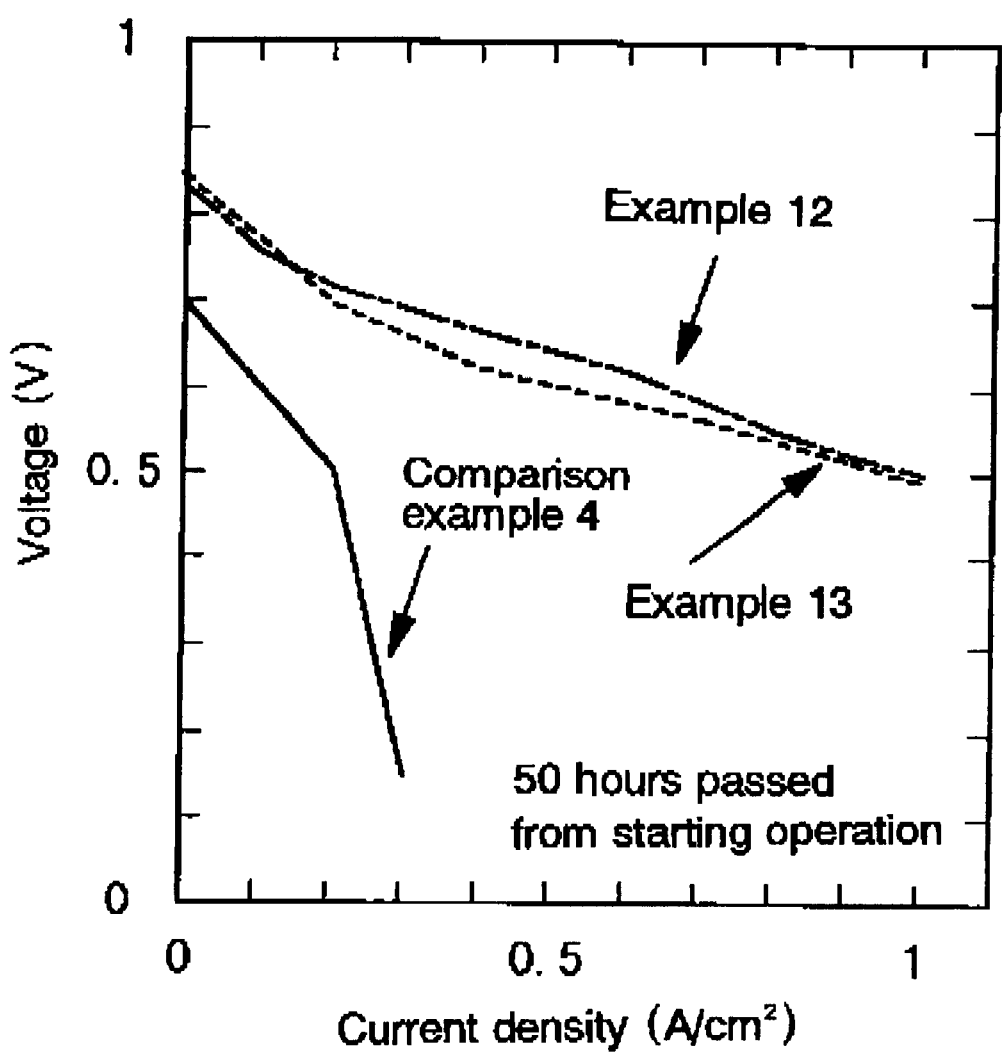
FIG. 7 is a graph showing a polarization characteristic (relation between a current density (A/cm$^2$) and a voltage (V)) after 50 hours passed from starting the fuel cell.

On the contrary, there was a significant difference after 50 hours running of each fuel cell under the driving conditions as following: 80° C. of an operating temperature of a fuel cell; 0.835 A/cm$^2$ of H$_2$ flow rate for supply to an anode; 1.5 A/cm$^2$ of O$_2$ flow rate for supply to a cathode; 70° C. of water bubbler for H$_2$; 50° C. of water bubbler for air; and 0.5 A/cm$^2$ of a constant current (accordingly, 1.67 times as much as H$_2$ and 3 times as much as O$_2$). FIG. 7 shows the results. Upon completion of 50 hours running, a current-voltage was measured, but the measurement was carried out by returning the conditions back to the initial conditions.

Based on the results shown in FIG. 7, according to the polarization curve after 50 hours running, there was an extremely fall in a cell performance with respect to the sulfonic acid type ETFE-g-PSt membrane having a graft ratio of 54% in Comparison example 4 to which the chelate groups were not introduced. On the contrary, the sulfonic acid type ETFE-g-PSt membrane introducing amino dimethylene phosphonic acid groups in Example 12 and the sulfonic acid type ETFE-g-PSt membrane introducing amino diacetic acid group in Example 13 showed a tendency for a voltage to fall slightly with the increase of a current density (A/cm$^2$), but the results obtained were excellent.

Based on the aforementioned results, it was confirmed that when the polymer electrolyte membrane were doped with the compounds containing the chelate groups or, when the chelate groups were introduced into the polymer electrolyte membrane by a chemical bond, then a fall in a conductivity of an electrolyte membrane was improved to be small in the case of the oxidation resistance test, furthermore, also in the case of running, the fuel cell showed the excellent current-voltage performance.

Based on these facts, it is taken into consideration that if the polymer electrolyte membrane are doped with the compounds containing the chelate groups or, if the chelate groups are introduced into the polymer electrolyte membrane by a chemical bonding, then even though metal ions (such as iron (II) chloride which causes hydrogen peroxide to be radicals, generated by electrode reaction in the fuel cell) are mixed therewith, but the metal ions are trapped by the chelate groups. Thus hydrogen peroxide is prohibited from being radicals, thereby the electrolyte membrane is controlled so as not to be degraded due to radicals of peroxide, as a result, its lifetime is extended.

There exists various types as the chelate groups as shown in chemical formulas (III), the following are listed up as the chelate groups; the carboxylic acid type groups, such as alkylamino monocarboxylic acid groups, alkylamino dicarboxylic acid groups, dialkylamino monocarboxylic acid groups, and alkylimino carboxylic acid groups; the phosphonic acid type groups, such as phosphonic acid groups, alkylamino monophosphonic acid groups, alkylamino diphosphonic acid groups, dialkylamino monophosphonic acid groups, and alkylimino phosphonic acid groups.

| Chemical formulas (III) |
|---|
| Alkylamino dicarboxylic acid groups |

$$\text{---R---N} \begin{array}{c} \text{R'COOH} \\ \text{R''COOH} \end{array}$$

Alkylamino monocarboxylic acid groups $$\text{---R---N} \begin{array}{c} \text{H} \\ \text{R'COOH} \end{array}$$

Dialkylamino monocarboxylic acid groups $$\text{---R---N} \begin{array}{c} \text{R'} \\ \text{R''COOH} \end{array}$$

Alkylimino dicarboxylic acid groups
—R=N—R'COOH
Phosphonic acid groups
—P(O)(OH)$_2$
Alkylamino diphosphonic acid groups $$\text{---R---N} \begin{array}{c} \text{R'---P(O)(OH)}_2 \\ \text{R''---P(O)(OH)}_2 \end{array}$$

Alkylamino monophosphonic acid groups $$\text{---R---N} \begin{array}{c} \text{H} \\ \text{R'---P(O)(OH)}_2 \end{array}$$

Dialkylamino monophosphonic acid groups $$\text{---R---N} \begin{array}{c} \text{R'} \\ \text{R'---P(O)(OH)}_2 \end{array}$$

Alkylimino phosphonic acid groups
—R=N—R'P(O)(OH)$_2$

Where R, R' and R" are hydrocarbon groups.

| Chemical formulas (IV) shows the chelate groups definitely. Chemical formulas (IV) |
|---|
| Methylamino diacetic acid groups |

$$\text{---CH}_2\text{---N} \begin{array}{c} \text{CH}_2\text{COOH} \\ \text{CH}_2\text{COOH} \end{array}$$

Methylamino monoacetic acetic acid groups

| Chemical formulas (IV) shows the chelate groups definitely. Chemical formulas (IV) |
|---|

$$\text{---CH}_2\text{---N} \begin{array}{c} \text{H} \\ \text{CH}_2\text{COOH} \end{array}$$

Methylamino-N-methylacetic acid groups $$\text{---CH}_2\text{---N} \begin{array}{c} \text{CH}_3 \\ \text{CH}_2\text{COOH} \end{array}$$

Methylamino monocarboxylic acid groups $$\text{---CH}_2\text{---N} \begin{array}{c} \text{R} \\ \text{RCOOH} \end{array}$$

Methylamino dicarboxylic acid groups $$\text{---CH}_2\text{---N} \begin{array}{c} \text{RCOOH} \\ \text{R'COOH} \end{array}$$

Methyl(ethylenediamine triacetic acid) groups

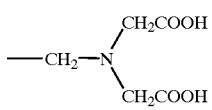

Imino propionic acid groups
=NCH$_2$CH$_2$COOH
Phosphonic acid groups
—P(O)(OH)$_2$
Methylamino di(methylphosphonic acid groups)

$$\text{---CH}_2\text{---N} \begin{array}{c} \text{CH}_2\text{---P(O)(OH)}_2 \\ \text{CH}_2\text{---P(O)(OH)}_2 \end{array}$$

Aminomethyl phosphonic acid groups $$\text{---N} \begin{array}{c} \text{H} \\ \text{CH}_2\text{---P(O)(OH)}_2 \end{array}$$

The chelate groups trap metal ions which promote that hydrogen peroxide to be radicals. Thereby it is avoided that the polymer electrolyte membrane is degraded due to radicals of hydrogen peroxide, thus it is achieved that the polymer electrolyte membrane can be maintained at a stable condition for a long period of time.

The present invention is not limited by any of the details of description, and modification and variation of the invention is possible in light of the above teachings. For example, the electrolyte membrane employed for the above mentioned embodiment was an example using the graft copolymer having the main chains of ethylene tetrafluoroethylene having sulfonic acid groups, the polyether sulfone having sulfonic acid groups, and the polyether ether ketone having sulfonic acid groups, but other than these ones, the present invention may be applied to various materials, such as the styrene divinylbenzene sulfonic acid type materials, conventional electrolyte materials, or prospective and inventive electrolyte materials.

In addition, various materials may be used as the compounds containing the chelate groups other than above mentioned poly(vinylphosphonic acid). As various materials may also be used as the chelate groups as described above.

Next, Example 14 and Example 15 of the present invention were prepared by impregnating a fuel cell electrolyte membrane with a water-insoluble compound having metal-trapping property (a hydrophobic molecular weight is more than or equal to 300); Example 16 and Example 17 of the present invention were prepared by impregnating a fuel cell graft membrane partially-containing a basic group with the acidic, (polymer) compounds having metal-trapping property.

EXAMPLE 14

The Electrolyte Membrane Impregnated with a Water-Insoluble Compound 1 having the Chemical Formula (V)

The ETFE-g-PSt membrane having a graft ratio of 40% was prepared, and then it was immersed in tetrahydrofuran solution of a water-insoluble compound 1 (10 wt %) having a chemical formula (V), under a temperature of 25° C. for 24 hours. Thereby the electrolyte membrane doped with the compound 1 was prepared. Based on the weight variation, a doping ratio was found, it was 20 wt %.

Chemical formula V

The compound 1

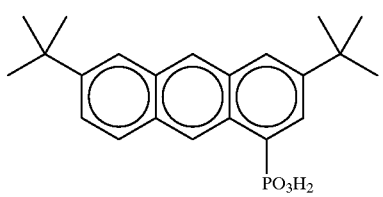

EXAMPLE 15

The ETFE-g-PSt Membrane Impregnated with a Water-Insoluble Compound 2 having a Chemical Formula (VI)

The ETFE-g-PSt membrane having a graft ratio of 40% was prepared, and then it was immersed in tetrahydrofuran solution of a water-insoluble compound 2 (10 wt %) having a chemical formula (VI), under a temperature of 25° C. for 24 hours. Thereby the electrolyte membrane doped with the compound 2 was prepared. Based on the weight variation, a doping ratio was found, it was 22 wt %.

Chemical formula VI

The compound 2

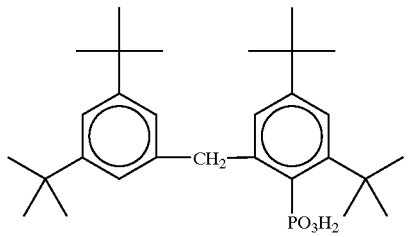

Comparison Example 5

The Electrolyte Membrane not Impregnated with a Water-Insoluble Compound

As Comparison example 5, the ETFE-g-PSt membrane having a graft ratio of 40%, prepared in Example 14 and Example 15, was used.

Next, the elution test and the hydrogen peroxide immersion test were conducted with respect to the electrolyte membrane impregnated with a water-insoluble compound 1 having the chemical formula (V) in Example 14, and the electrolyte membrane impregnated with a water-insoluble compound 2 having the chemical formula (VI), in comparison with the electrolyte membrane not impregnated with a water-insoluble compound in Comparison example 5. The details of which will be described hereinbelow.

The elution test was conducted based on the following procedures. Firstly, each electrolyte membrane (composite membrane) in Example 14 and Example 15 was immersed in water of 80° C. for 24 hours. Subsequently, an amount of dedoping were measured in order to evaluate the staying ability of the dope compounds in each electrolyte membrane. It is indicated that if an amount of dedoping is great then the doping compounds is not excellent in the staying ability, if not, then the doping compounds is excellent in the staying ability. With respect to Comparison example 5, the elution test was not performed because it was not impregnated.

The procedures of the elution test were as following. The doped membrane (approximately 25 cm$^2$) was immersed in 80° C. water (100 ml) for 24 hours. Subsequently, an amount of dedoping was found by the weight variation between before and after the immersion.

Furthermore, the hydrogen peroxide immersion test was performed as following. Each electrolyte membrane (composite membrane) in Example 14, Example 15 and Comparison example 5 was immersed in hydrogen peroxide solution for 15 minutes. Subsequently, a weight keeping ratio of each electrolyte membrane was examined. It is indicated that if a weight keeping ratio is low, then it is not excellent in the oxidation resistance performance, if not, then it is excellent in the oxidation resistance performance.

The definite procedures for examining a weight keeping ratio was following the same procedures as in Example 1, except that a period of time for immersion was 15 minutes.

The results are shown in Table 5.

TABLE 5

|  | An amount of dedoping | A weight keeping ratio of $H_2O_2$ |
|---|---|---|
| Example 14 | 0% | 90% |
| Example 15 | 0% | 90% |
| Comparison example 5 | — | 0% |

Based on the results as shown in Table 5, each amount of dedoping was 0% in Example 14 and Example 15. It was indicated that dedoping was not occurred. In the electrolyte membrane with which a water-insoluble compound was impregnated, a weight keeping ratio of $H_2O_2$ was 0%. While, in both of the electrolyte membrane in Example 14 and Example 15, each weight keeping ratio of $H_2O_2$ was 90%, satisfactorily. Based on the aforementioned results, it was indicated that when the electrolyte membrane was impregnated with a water-insoluble compound, then elution of the dope compounds could be suppressed and the fuel cell properties could be maintained for a long period of time.

In general, during a fuel cell driving, water is not only produced but also introduced into the cell by humidified gases. In the preferred embodiment, the reason why elution of the dope compound from electrolyte was suppressed is considered as following: electrolyte was doped with such a water-insoluble compound as to have a molecular weight of 200 or more by using organic solvent, therefore, the dope compound did not eluted from the membrane and not dissolved into water during a fuel cell running. Because, when the membrane was doped with water-soluble compounds, then the dope compounds eluted from the membrane easily and dissolved in water, resulting in dedoping during a fuel cell running. The reason why a molecular weight of hydrophobic part was defined as 200 or more was to ensure a size necessary for forming the hydrophobic interaction between the dope compounds and the hydrophobic part in the electrolyte membrane. More preferably, a molecular weight of a hydrophobic part may be more than or equal to 250, more preferably be more than or equal to 300, and more preferably be more than or equal to 400. Because, with the increase of a molecular weight, a hydrophobic interaction becomes large.

The ETFE membrane after irradiation with an electron ray of 20 kGy was immersed in a mixture solution composed of styrene and vinylpyridine (a ratio of mixture between styrene and vinylpyridine is 95:5) so as to react them for 4 hours under a temperature of 60° C. Thereby the EFTE membrane having a graft ratio of 45% was prepared.

Comparison Example 6

As Comparison example 6, the electrolyte membrane having a graft ratio of 45%, prepared in Example 16, was used.

Next, the elution test and the hydrogen peroxide immersion test were conducted with respect to the ETFE-g-PSt membrane introducing sulfonic acid group in Example 16, in comparison with the ETFE membrane not introducing phosphonic acid group in Comparison example 6. The results of the elution test and the hydrogen peroxide immersion test and the evaluation thereof were conducted following the same procedures as in Example 14. The results are shown in Table 6.

TABLE 6

|  | An amount of dedoping | ratio of $H_2O_2$ |
|---|---|---|
| Example 16 | 0% | 98% |
| Comparison example 6 | — | 70% |

Based on the results as shown in Table 6, the amount of dedoping was 0% in Example 16. It was indicated that dedoping was not occurred. In the electrolyte membrane in Comparison example 6 with which the acidic polymer compounds having metal-trapping property were not entirely impregnated, a weight keeping ratio of $H_2O_2$ was 70%. While, in the electrolyte membrane in Example 16, a weight keeping ratio of $H_2O_2$ was 98%, satisfactorily. Based on the aforementioned results, it was indicated that when the electrolyte membrane partially-containing a basic group (pyridine group) was impregnated with the acidic polymer compounds having metal-trapping property, then elution of the dope compounds could be suppressed and the fuel cell properties could be maintained for along period of time

EXAMPLE 17

The Electrolyte Membrane Partially-Containing a Basic Acid Group, the Membrane being Impregnated with the Acidic Polymer Compounds having Metal-Trapping Property The ETFE membrane after irradiation with an electron ray of 20 kGy was immersed in a mixture solution composed of styrene and vinylimidazole (a ratio of mixture between styrene and vinylimidazole is 95:5) so as to react them for 4 hours under a temperature of 60° C. Thereby the ETFE graft membrane having a graft ratio of 40%, was prepared.

Subsequently, by using chlorosulfuric acids, sulfonic acid groups were introduced into the resulting ETFE graft membrane to prepare the graft membrane with a sulfonic acid group introduced. Then, the resulting graft membrane with a sulfonic acid group introduced was immersed in vinylphosphonic acids solution (10 wt %) under a temperature of 25° C. for 24 hours. As a result, the dope ratio was 2.5 wt %.

Comparison Example 7

As Comparison example 7, the electrolyte membrane having a graft ratio of 40%, prepared in Example 17, was used.

Next, the elution test and the hydrogen peroxide immersion test were conducted with respect to the ETFE graft membrane introducing sulfonic acid groups in Example 17, in comparison with the ETFE graft membrane not introducing phosphonic acid groups. The results of the elution test and the hydrogen peroxide immersion test and the evaluation thereof were conducted following the same procedures as in Examples 14. The results are shown in Table 7.

TABLE 7

|  | An amount of dedoping | A weight keeping ratio of H$_2$O$_2$ |
| --- | --- | --- |
| Example 17 | 0% | 98% |
| Comparison example 6 | — | 72% |

Based on the results as shown in Table 7, an amount of dedoping was 0% in Example 17. It was indicated that dedoping was not occurred. In the electrolyte membrane in Comparison example 7 with which the acidic polymer compound having metal-trapping property were not entirely impregnated, a weight keeping ratio of H$_2$O$_2$ was 72%. While, in the electrolyte membrane in Example 17, a weight keeping ratio of H$_2$O$_2$ was 98%, satisfactorily. Based on the aforementioned results, it was indicated that when the electrolyte membrane partially-impregnated with a basic group (imidazole group) was impregnated with the acidic polymer compound having metal-trapping property, then elution of the dope compounds could be suppressed and the fuel cell properties could be maintained for a long period of time.

Figure 8:
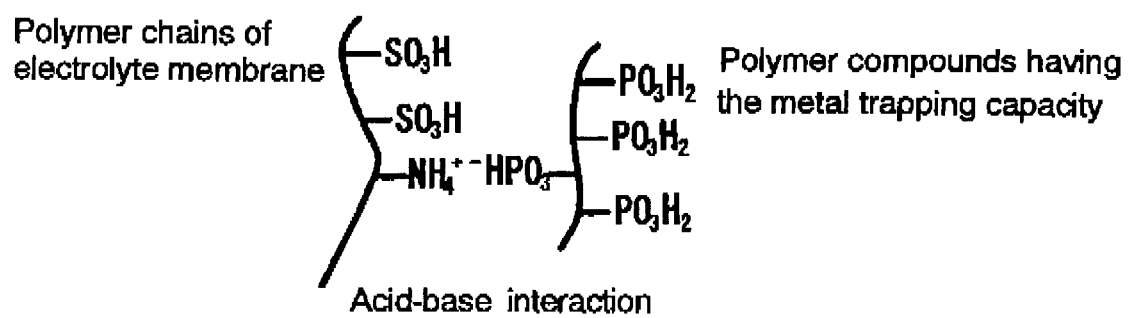
FIG. 8 is a view showing polymer chains of electrolyte membrane.

In Example 16 and Example 17, elimination of the dope compounds from electrolyte was suppressed, the reason is considered as following: to introduce the acidic polymer compounds having metal-trapping property into the graft membrane partially-containing a basic group (pyridine group, imidazole group) acts on them so as to form the acid-base interaction therebetween (see FIG. 8).

Next, the elution test and the hydrogen peroxide immersion test were conducted with respect to the fuel cell electrolyte membrane which was prepared by processes of impregnating with the monomer (polymer) having metal-trapping property, then crosslinking and making to be composite in Example 18, and the fuel cell electrolyte membrane which was prepared by processes of impregnating with the monomer (polymer) having metal-trapping property, then crosslinking and making to be composite in Example 19, in comparison with the electrolyte membrane not entirely impregnated with monomer etc., having metal-trapping property. The details of which will be described hereinbelow.

EXAMPLE 18

The graft membrane having a graft ratio of 40% was prepared. Subsequently, the resulting graft membrane was immersed in a mixture solution composed of vinylphosphonic acid (10 wt %) and divinylbenzenemonosulfonic acid (0.5 wt %) under a temperature of 25° C. for 24 hours so as to perform doping. A doping ratio was found based on the weight variation, the doping ratio was 9 wt %. Next, the resulting electrolyte membrane was irradiated with an ultraviolet ray so as to cause monomer polymerization, then the remaining monomer was eliminated by washing with water. The resulting composite membrane had a dope ratio of 7 wt %.

A dope ratio was found by following Expression 6:

$$(\text{Dope ratio}) = \frac{((\text{Weight of membrane after crosslinking and washing}) - (\text{starting weight})) \times 100}{(\text{Starting weight})}.$$

Expression 6

EXAMPLE 19

The graft membrane having a graft ratio of 40% was prepared. Subsequently, the resulting graft membrane was immersed in a tetrahydrofuran solution containing vinylphosphonic acids diethyl (10 wt %) and divinylbenzene (0.5 wt %) under a temperature of 25° C. for 24 hours so as to perform doping. A doping ratio was found based on the weight variation, the doping ratio was 5 wt %. Next, the resulting electrolyte membrane was irradiated with an ultraviolet ray so as to cause monomer polymerization, then the remaining monomer was eliminated by washing with tetrahydrofuran solution, and then the resulting membrane was refluxed in concentrated hydrochloric acids for 2 hours. The resulting composite membrane had a dope ratio of 4 wt %.

A dope ratio was found by following the same procedures as in Example 18.

Comparison Example 8

As Comparison example 8, the electrolyte membrane having a graft ratio of 40%, prepared in Example 18 and Example 19, was used.

Next, the elution test and the hydrogen peroxide immersion test were conducted with respect to the electrolyte membrane in Example 18 and Example 19, in comparison with the electrolyte membrane in Comparison example 8. The results of the elution test and the hydrogen peroxide immersion test and the evaluation thereof were conducted following the same procedures as in example 14. The results are shown in Table 8.

TABLE 8

|  | An amount of dedoping | A weight keeping ratio of H$_2$O$_2$ |
| --- | --- | --- |
| Example 18 | 0% | 95% |
| Example 19 | 0% | 95% |
| Comparison example 8 | — | 0% |

Based on the results as shown in Table 8, an amount of dedoping was 0% in Example 18 and Example 19. It was indicated that dedoping was not occurred. In the electrolyte membrane in Comparison example 8 with which monomer (polymer) having metal-trapping property was not entirely impregnated and, for which a crosslinking process and a composite process were not performed, a weight keeping ratio of H$_2$O$_2$ was 0%. While, in the electrolyte membrane in Example 18 and Example 19, each weight keeping ratios of H$_2$O$_2$ was 95%, satisfactorily. Based on the aforementioned results, it was indicated that when the electrolyte membrane was impregnated with the compounds having metal-trapping property and then was processed by polymerization and/or crosslinking, then it could be suppressed that elution of the dope compounds having metal-trapping property from the electrolyte membrane during a fuel cell running and the fuel cell properties could be maintained for a long period of time.

Figure 9:
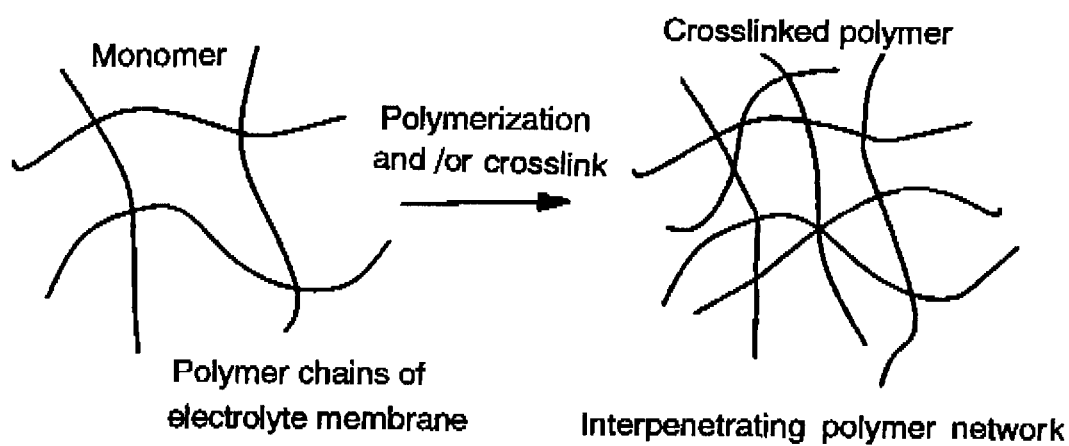
FIG. 9 is a view showing an interpenetrating polymer network.

In Example 18 and Example 19, elution of the dope compounds from electrolyte was suppressed, the reason is considered as following: the polymerization and/or crosslinking for the compounds having metal-trapping property acts on them so as to form the interpenetrating network with the polymers composing the electrolyte (see FIG. 9).

The present invention is not limited by any of the details of description, and modification and variation of the invention is possible in light of the above teachings. For example, as the polymer (monomer) having metal-trapping property, which is suitable for being impregnated into electrolyte, other than examples in Example 18 and Example 19, various kinds of the dope monomer and the dope polymer may be employed. For example, the dope monomer may satisfactorily be a monomer which has a functional group and/or a precursor thereof having metal-trapping property, susceptible to crosslinking and polymerizing. The functional groups may satisfactorily be phosphonic acid groups, carboxylic acid groups, amino groups, pyridine groups, imidazole groups, thiol groups, chelate groups composed by combining these functional groups, and the like. Polymerization groups are not also limited, but for example, the polymerization groups may satisfactorily be the functional group capable of performing addition polymerization, condensation polymerization, ring-opening polymerization, the reactive groups having carbon double bond capable of performing radical polymerization, and the like. Crosslinking agents for use in these chemical reaction, are not also limited, but for example, the crosslinking agents may satisfactorily be the compounds having the corresponding reactive groups in a molecule, the compounds having two or more of the reactive groups capable of reacting with the corresponding reactive groups, and the like. Particularly, so as to occur radical reaction, such one may be preferable that has carbon double bond capable of performing radical polymerization, such as divinylbenzene.

Furthermore, the dope polymer may satisfactorily be the polymer susceptible to cross-liking and have a functional group having metal-trapping property and/or a precursor of the functional group. As mentioned above, the functional groups may satisfactorily be phosphonic acid groups of carboxylic acid groups, amino groups, pyridine groups, imidazole groups, thiol groups, and chelate groups and the like. Crosslinking agents for use in these chemical reaction are not also limited, but for example, the crosslinking agents may satisfactorily be the compounds having two or more of the reactive groups capable of reacting with the corresponding reactive groups.

The foregoing description of the preferred embodiments of the invention has been presented for purposes of illustration and description. It is not intended to be exhaustive or to limit the invention to the precise form disclosed, and modifications and variations are possible in the light of the above teachings or may be acquired from practice of the invention. The embodiments chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A solid polymer electrolyte, comprising a polymer having electrolyte groups selected from the group consisting of sulfonic acid groups, carboxylic acid groups, and sulfone imide groups, and a chelate group, wherein at least a portion of the sulfonated or carboxylated polymer is a hydrocarbon, and the chelate group is selected from the group consisting of a phosphonic acid group, a carboxylic acid group bonded to a nitrogen atom via an alkyl group, and a phosphonic acid group bonded to a nitrogen atom via an alkyl group.

2. The solid polymer electrolyte according to claim 1, wherein said chelate group is chemically bonded to the sulfonated or carboxylated polymer.

3. The solid polymer electrolyte according to claim 1, wherein said polymer electrolyte comprises a mixture of the sulfonated or carboxylated polymer with a compound having the chelate group.

4. The solid polymer electrolyte according to claim 1, wherein said chelate group is a carboxylic acid group bonded to a nitrogen atom via an alkyl group, or a phosphonic acid group bonded to a nitrogen atom via an alkyl group.

5. The solid polymer electrolyte according to claim 4 wherein said chelate group is chemically bonded to the sulfonated or carboxylated polymer.

6. The solid polymer electrolyte according to claim 4, wherein said polymer electrolyte comprises a mixture of the sulfonated or carboxylated polymer with a compound having the chelate group.

7. The solid polymer electrolyte according to claim 4, wherein said chelate group is a phosphonic acid group bonded to a nitrogen atom via an alkyl group.

8. The solid polymer electrolyte according to claim 7, wherein said chelate group is chemically bonded to the sulfonated or carboxylated polymer.

9. The solid polymer electrolyte according to claim 7, wherein said polymer electrolyte comprises a mixture of the sulfonated or carboxylated polymer with a compound having the chelate group.

10. The solid polymer electrolyte according to claim 7, wherein said chelate group comprises at least one acid group selected from the group consisting of alkylamino monophosphonic acid groups, alkylamino diphosphonic acid groups, dialkylamino monophosphonic acid groups, alkylalkylene diamine triphosphonic acid groups, and alkylimino phosphonic acid groups.

11. The solid polymer electrolyte according to claim 10, wherein said chelate group is chemically bonded to the sulfonated or carboxylated polymer.

12. The solid polymer electrolyte according to claim 10, wherein said polymer electrolyte comprises a mixture of the sulfonated or carboxylated polymer with a compound having the chelate group.

13. The solid polymer electrolyte according to claim 4, wherein said chelate group is a carboxylic acid group bonded to a nitrogen atom via an alkyl group.

14. The solid polymer electrolyte according to claim 13, wherein said chelate group is chemically bonded to the sulfonated or carboxylated polymer.

15. The solid polymer electrolyte according to claim 13, wherein said polymer electrolyte comprises a mixture of the sulfonated or carboxylated polymer with a compound having the chelate group.

16. The solid polymer electrolyte according to claim 13, wherein said chelate group comprises at least one acid group selected from the group consisting of alkylamino monocarboxylic acid groups, alkylamino dicarboxylic acid groups, dialkylamino monocarboxylic acid groups, alkylalkylene diamine tricarboxylic acid groups, and alkylimino carboxylic acid groups.

17. The solid polymer electrolyte according to claim 16, wherein said chelate group is chemically bonded to the sulfonated or carboxylated polymer.

18. The solid polymer electrolyte according to claim 16, wherein said polymer electrolyte comprises a mixture of the sulfonated or carboxylated polymer with a compound having the chelate group.

19. The solid polymer electrolyte according to claim 1, wherein said chelate group is a phosphonic acid group.

20. The solid polymer electrolyte according to claim 19, wherein said chelate group is chemically bonded to the sulfonated or carboxylated polymer.

21. The solid polymer electrolyte according to claim 19, wherein said polymer electrolyte comprises a mixture of the sulfonated or carboxylated polymer with a compound having the chelate group.

22. The solid polymer electrolyte according to claim 1, wherein the hydrocarbon portion of the sulfonated or carboxylated polymer is styrene graft-polymerized to a polymer partially-containing fluorine.

23. The solid polymer electrolyte according to claim 1, wherein the hydrocarbon portion of the sulfonated or carboxylated polymer comprises a polymer partially-containing an aromatic compound.

24. The solid polymer electrolyte according to claim 1, wherein the solid polymer electrolyte has a proton conductivity at 25° C. which is more than or equal to $10^{-2}$ S/cm.

25. The solid polymer electrolyte according to claim 1, having the form of a fiber or film.

26. A membrane electrode assembly, prepared by bonding an electrode to the solid polymer electrolyte according to claim 25.

27. An electrochemical device comprising the membrane electrode assembly according to claim 26.

28. A fuel cell comprising the membrane electrode assembly according to claim 26.

29. A solid polymer electrolyte comprising chelate groups and a polymer having electrolyte groups, wherein at least a portion of the polymer is a hydrocarbon, and the chelate group comprises at least one acid group selected from the group consisting of alkylamino monophosphonic acid groups, alkylamino diphosphonic acid groups, dialkylamino monophosphonic acid groups, alkylalkylene diamine triphosphonic acid groups, and alkylimino phosphonic acid groups.

30. A solid polymer electrolyte comprising chelate groups and a polymer having electrolyte groups, wherein at least a portion of the polymer is a hydrocarbon, and the chelate group comprises at least one acid group selected from the group consisting of alkylamino monocarboxylic acid groups, alkylamino dicarboxylic acid groups, dialkylamino monocarboxylic acid groups, alkylalkylene diamine tricarboxylic acid groups, and alkylimino carboxylic acid groups.

31. A solid polymer electrolyte comprising chelate groups and a polymer having electrolyte groups, wherein at least a portion of the polymer is a hydrocarbon, and the solid polymer electrolyte has a proton conductivity at 25° C. which is more than or equal to $10^{-2}$ S/cm.

* * * * *